US006876896B1

(12) United States Patent
Ortiz et al.

(10) Patent No.: US 6,876,896 B1
(45) Date of Patent: Apr. 5, 2005

(54) VARIABLE MOTION SYSTEM AND METHOD

(75) Inventors: Mark S. Ortiz, Milford, OH (US); Emil D. Bogdanov, Loveland, OH (US); Mohammad R. Naji, Loveland, OH (US); Keith G. Jacobs, Loveland, OH (US); Gregory A. Bologna, Loveland, OH (US); Donald A. Arms, Middletown, OH (US)

(73) Assignee: AB TetraPak, Lund (SE)

(*) Notice: Subject to any disclaimer, the term of this patent is extended or adjusted under 35 U.S.C. 154(b) by 0 days.

(21) Appl. No.: 09/558,233

(22) Filed: Apr. 26, 2000

Related U.S. Application Data

(60) Provisional application No. 60/185,019, filed on Feb. 25, 2000, provisional application No. 60/185,020, filed on Feb. 25, 2000, provisional application No. 60/185,065, filed on Feb. 25, 2000, provisional application No. 60/131,027, filed on Apr. 26, 1999, provisional application No. 60/137,346, filed on Jun. 3, 1999, and provisional application No. 60/144,483, filed on Jul. 17, 1999.

(51) Int. Cl.$^7$ .............................................. G06F 19/00
(52) U.S. Cl. ....................................... 700/112; 318/135
(58) Field of Search ............................ 700/95, 96, 112, 700/114; 318/135

(56) References Cited

U.S. PATENT DOCUMENTS

| | | | |
|---|---|---|---|
| 1,986,422 A | 1/1935 | Zwoyer | 93/3 |
| 2,199,708 A | 5/1940 | Maxfield | 164/48 |
| 2,200,971 A | 5/1940 | Sonneborn et al. | 93/3 |
| 2,294,215 A | 8/1942 | Sonneborn et al. | 93/18 |
| 2,346,776 A | 4/1944 | Malhiot | 93/6 |

(Continued)

FOREIGN PATENT DOCUMENTS

| | | |
|---|---|---|
| CH | 362644 | 7/1962 |
| DE | 22 57 321 | 5/1973 |
| DE | 298 22 122 U1 | 5/2000 |
| EP | 0 255 474 A2 | 6/1987 |
| EP | 0 485 208 A1 | 5/1992 |

(Continued)

OTHER PUBLICATIONS

Article on "Communication Smooths Out the Bumps" by Chuck Lewin, Jan./Feb. 1998 Motion Control.
Article on "Holding the Line" by Rob Matthes Jul. Aug. 1998 Motion Control.
International Search Report for PCT/US00/11342, issued on Jul. 21, 2000.

*Primary Examiner*—Leo Picard
*Assistant Examiner*—Sheela S. Rao
(74) *Attorney, Agent, or Firm*—Dechert, LLP; John W. Ryan

(57) ABSTRACT

The invention relates to a system and a method for performing a manufacturing operation at a predetermined position relative to a first path. The system includes a plurality of first elements mounted for movement relative to the first path. The first elements have a plurality of motion parameters which are independently controllable. Active elements are operatively associated with reactive elements to produce relative movement between the first elements and the first path, with the active elements controlling the relative movement. A controller controls the activation of the active elements and a first tool is associated with each first element for performing at least part of the manufacturing operation. The system may also include at least one second element and a second path. The method includes the steps of mounting a plurality of first carriages for movement relative to a first path, operatively associating a plurality of active elements with at least one reactive element to produce relative movement between the first carriages and the path, associating a first tool with each first carriage for performing at least part of the manufacturing process, and controlling the activation of the active elements.

29 Claims, 11 Drawing Sheets

U.S. PATENT DOCUMENTS

| | | | |
|---|---|---|---|
| 3,262,244 A | 7/1966 | Cutler et al. | 53/182 |
| 3,300,944 A | 1/1967 | Thesing | 53/28 |
| 3,388,525 A | 6/1968 | Thesing et al. | 53/39 |
| 3,505,776 A | 4/1970 | Cloud | 53/51 |
| 3,918,236 A | 11/1975 | Allen | 53/29 |
| 3,943,683 A | 3/1976 | Kovacs et al. | 53/51 |
| 4,005,349 A * | 1/1977 | Brian | 318/569 |
| 4,009,551 A | 3/1977 | Greenawalt et al. | 53/28 |
| 4,073,121 A | 2/1978 | Greenawalt et al. | 53/112 |
| 4,199,919 A | 4/1980 | Moscatelli | 53/552 |
| 4,217,745 A | 8/1980 | Watzka | 53/531 |
| 4,279,098 A | 7/1981 | Kulesza et al. | 46/101 |
| 4,371,768 A | 2/1983 | Pozna | 219/10.53 |
| 4,383,438 A | 5/1983 | Eaton | 73/61.2 |
| 4,387,547 A | 6/1983 | Reil | 53/131 |
| 4,505,464 A | 3/1985 | Chitayat | 269/73 |
| 4,560,911 A | 12/1985 | Chitayat | 318/135 |
| 4,580,392 A | 4/1986 | Lagerstedt et al. | 53/451 |
| 4,595,870 A | 6/1986 | Chitayat | 318/687 |
| 4,614,078 A | 9/1986 | Kawabe | 53/551 |
| 4,633,148 A * | 12/1986 | Prucher | 318/135 |
| 4,637,199 A | 1/1987 | Steck et al. | 53/451 |
| 4,654,590 A | 3/1987 | Kitaura et al. | 324/208 |
| 4,663,916 A | 5/1987 | Ohlsson | 53/551 |
| 4,696,146 A | 9/1987 | Esch et al. | 53/529 |
| 4,704,509 A | 11/1987 | Hilmersson et al. | 219/10.53 |
| 4,727,707 A | 3/1988 | Hadden | 53/451 |
| 4,731,980 A | 3/1988 | Worden et al. | 53/551 |
| 4,733,143 A | 3/1988 | Chitayat | 318/135 |
| 4,744,551 A | 5/1988 | Chitayat | 269/55 |
| 4,749,921 A | 6/1988 | Chitayat | 318/135 |
| 4,757,668 A | 7/1988 | Klinkel et al. | 53/451 |
| 4,760,294 A | 7/1988 | Hansen | 310/13 |
| 4,776,147 A | 10/1988 | Konzal et al. | 53/375 |
| 4,776,830 A | 10/1988 | Fujikawa et al. | 493/133 |
| 4,812,725 A | 3/1989 | Chitayat | 318/625 |
| 4,817,366 A | 4/1989 | Konzal et al. | 53/451 |
| 4,819,414 A | 4/1989 | Worden et al. | 53/551 |
| 4,834,353 A | 5/1989 | Chitayat | 269/73 |
| 4,838,847 A | 6/1989 | Kume et al. | 493/133 |
| 4,848,063 A | 7/1989 | Niske | 53/45 |
| 4,881,360 A | 11/1989 | Konzal et al. | 53/439 |
| 4,970,464 A | 11/1990 | Williams | 324/207.13 |
| RE33,467 E | 12/1990 | Steck et al. | 53/451 |
| 4,985,651 A | 1/1991 | Chitayat | 310/12 |
| 4,999,974 A | 3/1991 | Kovacs et al. | 53/434 |
| 5,001,891 A | 3/1991 | Abate | 53/551 |
| 5,023,495 A | 6/1991 | Ohsaka et al. | 310/12 |
| 5,031,386 A | 7/1991 | Schneider | 53/551 |
| 5,069,021 A | 12/1991 | Reil et al. | 53/563 |
| 5,074,238 A | 12/1991 | Telchuk et al. | 118/326 |
| 5,111,404 A | 5/1992 | Kotani | 700/108 |
| 5,120,292 A | 6/1992 | Ueda et al. | 493/124 |
| 5,155,980 A | 10/1992 | Mansson et al. | 53/551 |
| 5,230,688 A | 7/1993 | Hatchell et al. | 493/193 |
| 5,313,037 A | 5/1994 | Hansen et al. | 219/632 |
| 5,353,495 A | 10/1994 | Terabayashi et al. | 29/714 |
| 5,377,474 A | 1/1995 | Kovacs et al. | 53/64 |
| 5,444,220 A | 8/1995 | Hansen et al. | 219/633 |
| 5,528,883 A | 6/1996 | Jamison | 53/562 |
| 5,533,322 A | 7/1996 | Bacon et al. | 53/451 |
| 5,540,035 A | 7/1996 | Plahm et al. | 53/451 |
| 5,548,947 A | 8/1996 | Fincham et al. | 53/551 |
| 5,560,473 A | 10/1996 | Ivancoso, Jr. et al. | 198/803.11 |
| 5,570,562 A | 11/1996 | Anderson | 53/250 |
| 5,638,461 A | 6/1997 | Fridge | 382/141 |
| 5,649,407 A | 7/1997 | Blomqvist | 53/374.8 |
| 5,651,235 A | 7/1997 | Ashley et al. | 53/458 |
| 5,653,085 A | 8/1997 | Suga | 53/75 |
| 5,706,627 A | 1/1998 | Kirka et al. | 53/52 |
| 5,771,660 A | 6/1998 | Loewenthal | 53/374.5 |
| 5,775,063 A | 7/1998 | Ikai et al. | 53/463 |
| 5,787,690 A | 8/1998 | Konno | 53/550 |
| 5,816,018 A | 10/1998 | Bois | 53/133.4 |
| 5,831,352 A | 11/1998 | Takei | 310/12 |
| 5,868,899 A | 2/1999 | Gundersen | 156/538 |
| 5,881,539 A | 3/1999 | Fukuda et al. | 53/526 |
| 5,925,943 A | 7/1999 | Chitayat | 310/12 |
| 5,942,817 A | 8/1999 | Chitayat | 310/12 |
| 5,965,963 A | 10/1999 | Chitayat | 310/12 |
| 5,971,905 A | 10/1999 | Fukuda | 493/3 |
| 5,977,664 A | 11/1999 | Chitayat | 310/12 |
| 5,982,053 A | 11/1999 | Chitayat | 310/12 |
| 5,994,798 A | 11/1999 | Chitayat | 310/12 |
| 6,006,503 A | 12/1999 | Davison et al. | 53/551 |
| 6,032,437 A | 3/2000 | Bois | 53/412 |
| 6,035,604 A | 3/2000 | Gustafsson | 53/64 |
| 6,035,615 A | 3/2000 | Hansson et al. | 53/551 |
| 6,038,838 A | 3/2000 | Fontanazzi | 53/551 |
| 6,051,897 A | 4/2000 | Wissler et al. | 310/14 |
| 6,067,778 A | 5/2000 | Yamamoto et al. | 53/451 |
| 6,079,188 A | 6/2000 | Katayama et al. | 53/451 |
| 6,085,495 A | 7/2000 | Fontanazzi et al. | 53/551 |
| 6,085,496 A | 7/2000 | Fontanazzi et al. | 53/551 |

FOREIGN PATENT DOCUMENTS

| | | |
|---|---|---|
| EP | 0 728 668 A1 | 8/1996 |
| EP | 0 764 584 A2 | 3/1997 |
| EP | 0764584 A2 | 3/1997 |
| EP | 0 876 903 A1 | 11/1998 |
| EP | 0 887 263 A1 | 12/1998 |
| EP | 0 887 264 A1 | 12/1998 |
| EP | 0 887 265 A1 | 12/1998 |
| EP | 0 887 268 A1 | 12/1998 |
| EP | 0 887 269 A1 | 12/1998 |
| EP | 0 887 270 A1 | 12/1998 |
| EP | 0 887 273 A1 | 12/1998 |
| EP | 0 959 007 A1 | 11/1999 |
| EP | 1 008 525 A1 | 6/2000 |
| GB | 716783 | 11/1961 |
| GB | 1253836 | 11/1971 |
| GB | 2 042 962 A | 10/1980 |
| GB | 2 257 321 A | 6/1993 |
| JP | 1-240433 | 9/1989 |
| WO | WO 90/08086 | 7/1990 |
| WO | WO/96/27544 A1 | 9/1996 |
| WO | WO 96/27544 | 9/1996 |

* cited by examiner

VARIABLE MOTION SYSTEM AND METHOD

CROSS-REFERENCE TO RELATED APPLICATIONS

This application claims the benefit of U.S. Provisional Applications No. 60/131,027, filed Apr. 26, 1999; 60/137,346, filed Jun. 3, 1999; 60/144,483, filed Jul. 17, 1999; and 60/185,019, 60/185,020, 60/185,065, each filed on Feb. 25, 2000.

FIELD OF THE INVENTION

The present invention relates to a variable motion system and method for providing controlled positioning of a plurality of movable elements as components. In particular, the present invention relates to utilizing a linear motor to independently control and position a plurality of movable elements along a path in a production process or manufacturing environment so that work may be performed during the process.

BACKGROUND OF THE INVENTION

Movable elements are often provided as part of an overall machine, device or system, such as a production process or manufacturing environment. In this type of process or environment, it is desirable that all of the movable elements be mounted for movement along one or more defined paths, that all of the elements be movable independently of others of the movable elements, and that the movement of all of the movable elements be controlled independently of the other movable elements, subject to the limitation that no two movable elements may occupy the same space at any given time. In such a system or method, control of the movement of the elements is necessary. The control may include establishing and/or maintaining a state of "non-movement" of one or more of the elements, and/or may include urging one or more of the movable elements along the path at a given velocity, acceleration, force, and/or direction, or a combination of these latter parameters (herein referred to at times as "control variables"). Herein the term "force" is used to denote energy applied to a movable element or group of movable elements to affect, in some manner, controlled movement or non-movement of a movable element along the path.

Electric motors conventionally include a stationary portion, or stator, and a movable portion. In electric motors adapted for turning an output shaft, the movable portion, called the rotor, is concentrically arranged with the stator. Although the most common rotary motor employs a cylindrical rotor rotating within an annular stator, the reverse arrangement is also known.

An electric motor of the linear type is also known. A linear motor employs a stator which can be thought of as being similar to the stator of a rotary motor, except for the stator is formed into a flattened assembly. Similarly, the rotor of the rotary motor is replaced by a linear counterpart which moves in a line with respect to the stator.

Heretofore, it has been suggested that a linear motor may be employed to effect movement of elements along a path. Prior linear motor systems, such as that utilized in U.S. Pat. No. 4,595,870, controlled the position of the movable element through detection of the position of a single movable element and by feeding to appropriate ones of the coils of the non-movable element electrical energy for altering the position of the movable element along the length of the non-movable element. Such relatively simple applications of linear motors have become almost commonplace for moving a single movable element bidirectionally along a linear, i.e., straight path. In one application, this general concept has been employed to propel a movable element along a circular path of constant radius. In one specific application, a type of AC linear induction motor has been employed in an amusement park roller coaster to propel a carriage to its point of commencement of gravitational fall. In this application, the propulsion path is linear. Generally stated, these prior linear motors included a single source of electrical energy input for propelling a single movable element along the length of a non-movable element, employing certain of the principles as are commonly employed in rotary motors.

More recently, U.S. Pat. No. 5,965,963 depicts a system that utilizes a linear motor that includes more than one movable stage movable independently on the same path. The system of this patent utilizes a plurality of stationary armature windings grouped in repeating sets of three around a continuous path. The armature windings lie side by side along the path. The path may have both straight and curved portions. A plurality of switches are associated with the armature windings to allow the armature windings to influence the movement of a movable element along the path. The armature windings are activated to move the movable element along the path when motor magnets that are mounted on the movable elements come into association with the respective windings to close the respective switches. At other times, the switches are opened such that the armature windings are inactivated.

The system of U.S. Pat. No. 5,965,963 may be either a closed-loop or an open-loop control system. The closed-loop system, permits accurate control of position, velocity, and acceleration of the movable elements. This system utilizes linear encoders, a switching magnet, switching sensors, an encoder magnet, and encoder sensors to control such variable as position, velocity, or acceleration. The switching sensors that are utilized are Hall-effect devices. Hall-effect devices produce a current when exposed to a particular magnetic polarity.

A linear motor that is capable of moving a movable element along a fixed curvilinear path is highly desirable in the manufacturing and production arenas. In practice, in a manufacturing process, for example, the process commonly includes equipment or apparatus which is programmed to perform, at each work station, a specific function in the overall process. This performance at each work station is commonly of a known duration, e.g., one cycle per a given period of time. In the prior art, the duration of the function performed at each work station commonly was a function, not of the activity being performed, but of the speed with which a product could be moved into and out of the work station on a conveyor. In those manufacturing processes in which a closed loop conveyor was required to move an individual product into a series of work stations, through the work stations, and to an offload station, the time limiting factor for the overall process was a function of how quickly a "product grasping" carriage on the conveyor could be moved from the offload station to the starting point of the series of work stations.

Heretofore, one attempt to overcome this limitation was to provide carriages spaced very closely together along the entire length of the looped conveyor and to run the conveyor at the fastest possible speed, such as shown in EP 0 887 263 A1, EP 0 887 264 A1, EP 0 887 273 A1, or U.S. Reissue Pat. No. 33,467. This situation relies upon mechanical aspects of the system such as the precision of operation of the conveyor, the accuracy with which the conveyor can be stopped at a work station and started for movement to a further work station, the acceleration which is possible between starts and stops, and other mechanical limitations. Downtime for maintenance and/or repair of these prior art systems is inordinately high and costly both in time and money. There is a demonstrated need, therefore, for improvements and enhancements of such systems, and this need is satisfied by the present invention.

SUMMARY OF THE INVENTION

The present invention now provides a system for use in a manufacturing operation, production process, or other process or operation comprising a plurality of movable elements that are constrained for movement along a path and wherein the position of each of the movable elements along the path is controlled independently of the position along the path of every other of the movable elements of the system. In addition, the invention provides a method for effecting control of each of a plurality of movable elements of a linear motor-type drive along a common path so that work may be performed at one or more stations along the path.

Accordingly, the system and method perform a manufacturing operation at a static or moving position relative to a first path. The system of the invention includes a plurality of first carriages, a plurality of first active elements, at least one first reactive element, at least one controller, and a first tool associated with each first carriage for performing at least part of the manufacturing operation. The plurality of first carriages are mounted for independent movement relative to the first path, with each first carriage having at least one motion parameter for independently controlling the first carriages. The plurality of first active elements are associated with at least one first reactive element to produce relative movement between the first carriages and the first path. Preferably, the controller controls the activation of the first active elements in order to provide independent control of each first carriage. In operation, the first active elements are selectively activated by the controller to direct the first carriages along the path so that the manufacturing operation can at least partially be conducted by the first tool.

In one embodiment, the first carriages are movable while the first path is curvilinear and fixed. The motion parameters typically include one or more of force, acceleration, velocity, direction, position, torque, or jerk. The active elements may be electrically conductive coils that are electrically insulated from neighboring coils and arranged along the first path, with each of the coils, when enabled, establishing an electromagnetic field. The electromagnetic field is effective to influence the reactive element when the reactive element is associated with the field. The controller may control the enablement of respective ones of the coils as a function of the location of each first carriage along the first path so that each first carriage is independently controlled.

In another embodiment of the inventive system, the system also includes at least one second path having a plurality of second carriages mounted for relative movement relative to that path. In this embodiment, each second carriage has at least one motion parameter independently controlling each second carriage and a plurality of independently activatable second active elements operatively associated with at least one second reactive element to produce relative movement between the second carriages and the second path. The second active elements may be electrically conductive coils that are electrically insulated from neighboring coils and arranged along the second path, with each of the coils, when enabled, establishing an electromagnetic field. The electromagnetic field is effective to influence the reactive elements when the reactive elements are associated with the field. As with the first carriages, the controller controls the activation of the second active elements in order to provide independent control of the motion parameters of each second carriage. During the motion of the first and second carriages, the first tool cooperates with the second carriage to perform the manufacturing operation.

In the second embodiment, the first and second carriages are preferably controlled to cooperate to conduct the manufacturing operation. A second tool may also be associated with the second carriage for performing at least part of the manufacturing operation. Both first and second controllers may be provided, with the first controller controlling activation of the first carriage and the second controller controlling activation of the second carriage. The first and second controllers may control the enablement of respective ones of the coils on the first and second paths as a function of the location of each first and second carriage along the first and second paths so that each first and second carriage is independently controlled. A single controller may perform the functions of the first and second controllers.

The method of the present invention preferably includes the steps of mounting a plurality of first carriages for independent movement relative to a first path, operatively associating a plurality of first active elements with at least one first reactive element to produce relative movement between the first carriages and the first path, associating a first tool with each first carriage, and controlling the activation of the first active elements. Each first carriage preferably has at least one motion parameter. During the controlling stage, the activation of the first active elements is controlled to direct the first carriages along the first path where the manufacturing operation is at least partially conducted by the first tool.

Another embodiment of this method includes the steps of mounting a plurality of second carriages for independent movement relative to a second path, with each second carriage having at least one motion parameter. The method also includes associating a plurality of second active elements with at least one second reactive element to produce relative movement between the second carriages and the second path. Each second active element is independently activated to control this relative movement. The method also includes controlling the activation of the first and second active elements in order to provide independent control of the motion parameters of the first and second carriages so that the first and second carriages move along the path in order for the manufacturing operation to be conducted. The method may also include associating a first and second tool with each first and second carriage, respectively, and controlling the first and second tools to cooperate to conduct the manufacturing operation. The method may also include moving the first and second carriages in unison along the first and second paths as the tools cooperate to conduct the manufacturing process.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE INVENTION

The system of the present invention may be employed in an "open loop" or a "closed loop" configuration. "Open loop" refers to a control system in which there is no feedback as to the position, velocity, acceleration, direction, force, torque, jerk, and/or other motion parameters (hereinafter "control variable") of a movable element at any given point in time. In an "open loop" system, each of the movable elements is controlled positionally along a path by appropriate electrical energy being supplied to individual ones of the coils located along the path. The nature of the electrical energy applied to the coils determines what reaction the reactive element of the system will exhibit. Position or other motion parameters are not monitored. In a "closed loop" system, a feedback arrangement is provided which signals the position, velocity, acceleration, direction, force, torque and/or jerk, or other motion parameters, of each of the plurality of movable elements at a given time. This feedback signal from each of the movable elements of the closed loop system is employed to modify the electrical energy to be fed to a coil or subset of coils to effect a desired motion parameter for each of the movable elements. Output from a controller which is representative of the desired position/time status of each movable element is also employed to modify the electrical energy that is ultimately fed to respective ones of the coils to effect a desired reaction of each movable member at a given point in time. An open loop system is often desirable where feedback is not necessary, i.e., a repeated force input, such as a jackhammer or staple gun, for example. A closed loop system is often utilized, for example, where precise position control is necessary, i.e., for a machine tool.

Figure 1:
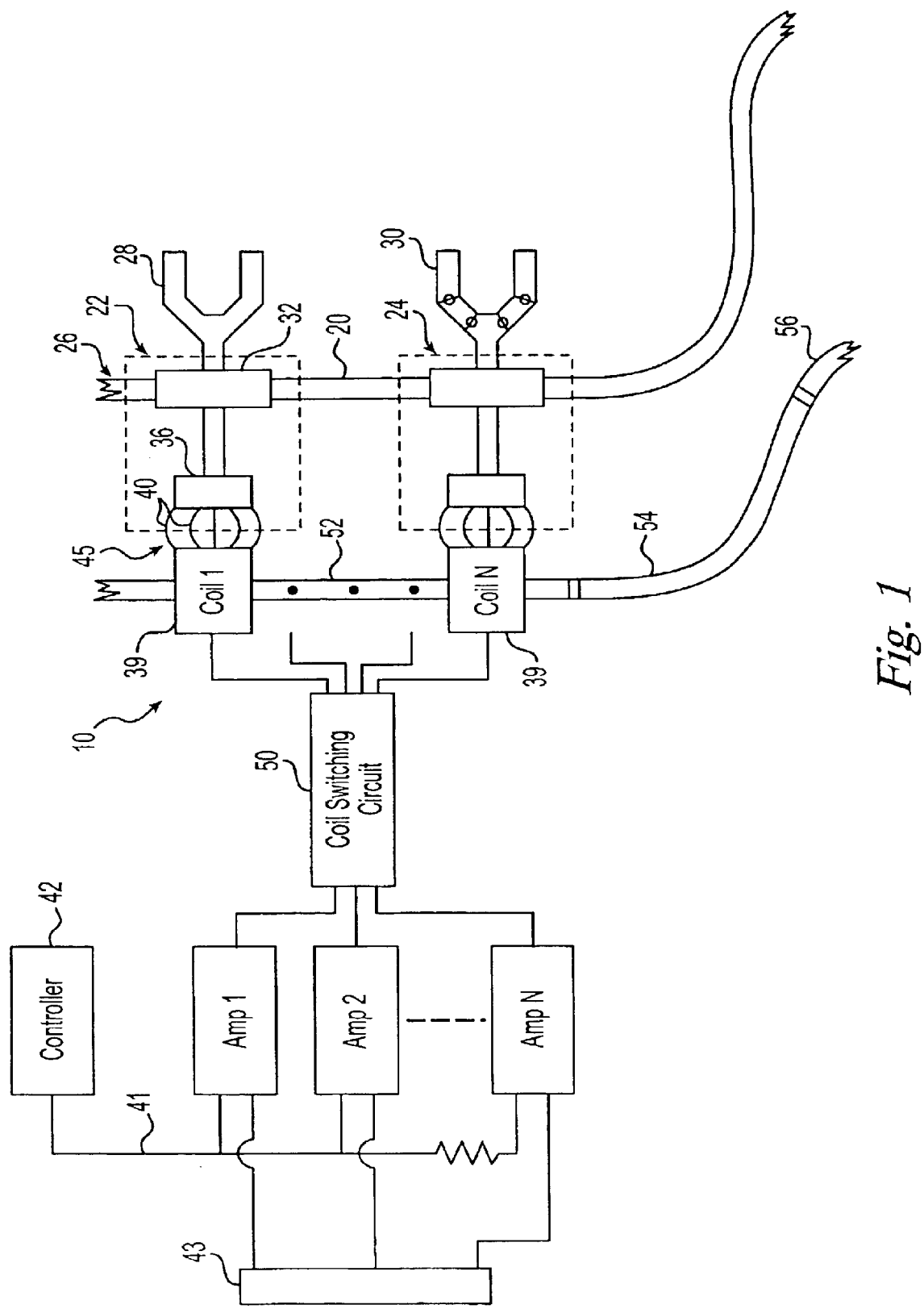
FIG. 1 is a schematic representation of a system embodying various features of the present invention and depicting control over the movement of a plurality of movable elements along a path.

FIG. 1 represents an open loop system 10 embodying various features of the present invention, including a plurality of electrically conductive coils, Coil 1 . . . Coil N, which are electrically insulated from their neighbor coils, and which are aligned in a basically side-by-side arrangement. In FIG. 1 there are depicted only two coils, namely Coil 1 and Coil N with the indication that there may be any number of additional coils disposed in the aligned array of coils.

The depicted system further includes a plurality of movable elements 22 and 24, for example, which are mounted for movement along the length of a track 26 defining a path 20 which in FIG. 1 is depicted to run parallel with the aligned coils. Whereas in FIG. 1 the aligned coils and the track are shown as being physically separated, in practice, commonly, the track and the coils are disposed in substantially contiguous relationship. In FIG. 1, each movable element is depicted as including a working member 28 and 30, respectively. Each working member may comprise any type of implement, device or the like which performs some work function, usually work on a product as in an assembly line, as its associated movable element is moving along the path/track or is held stationary at some position along the path/track.

Figure 2:
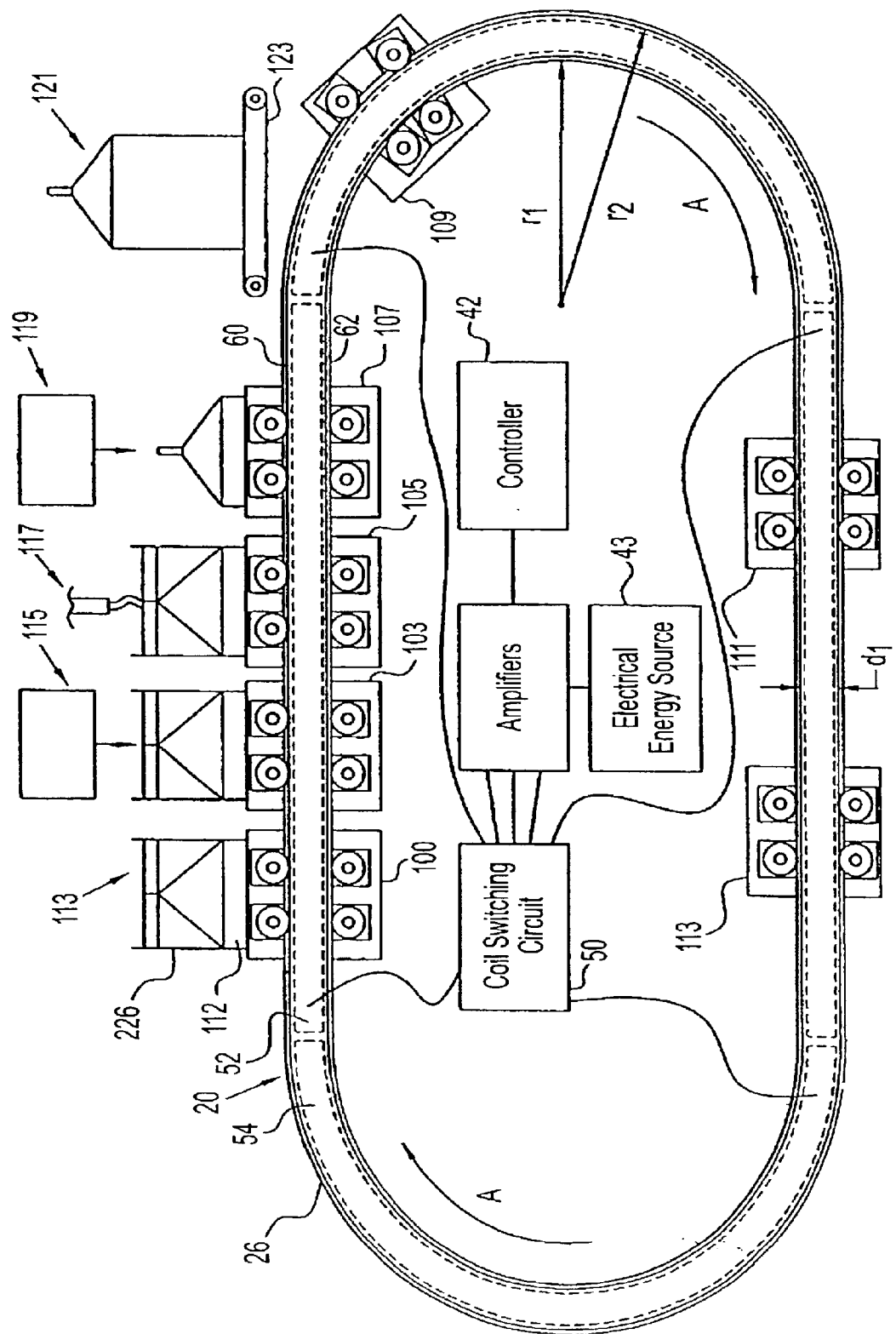
FIG. 2 is a schematic representation of one embodiment of a system in accordance with the present invention and depicting control of the movement of a plurality of movable elements along a closed path and past a plurality of work stations, each movable element functioning to receive and transport a product between successive work stations.
Figure 4:
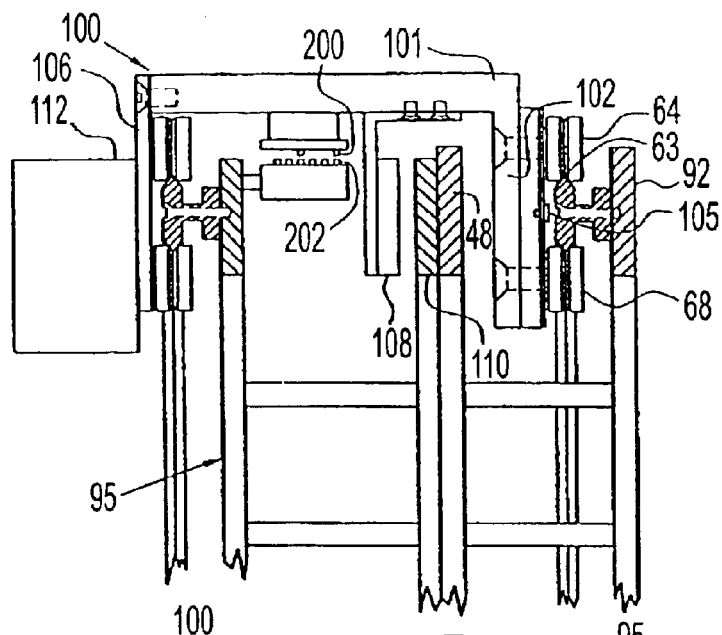
FIG. 4 is a left hand end partial representation, in perspective, of the track system depicted in FIG. 3.
Figure 3:
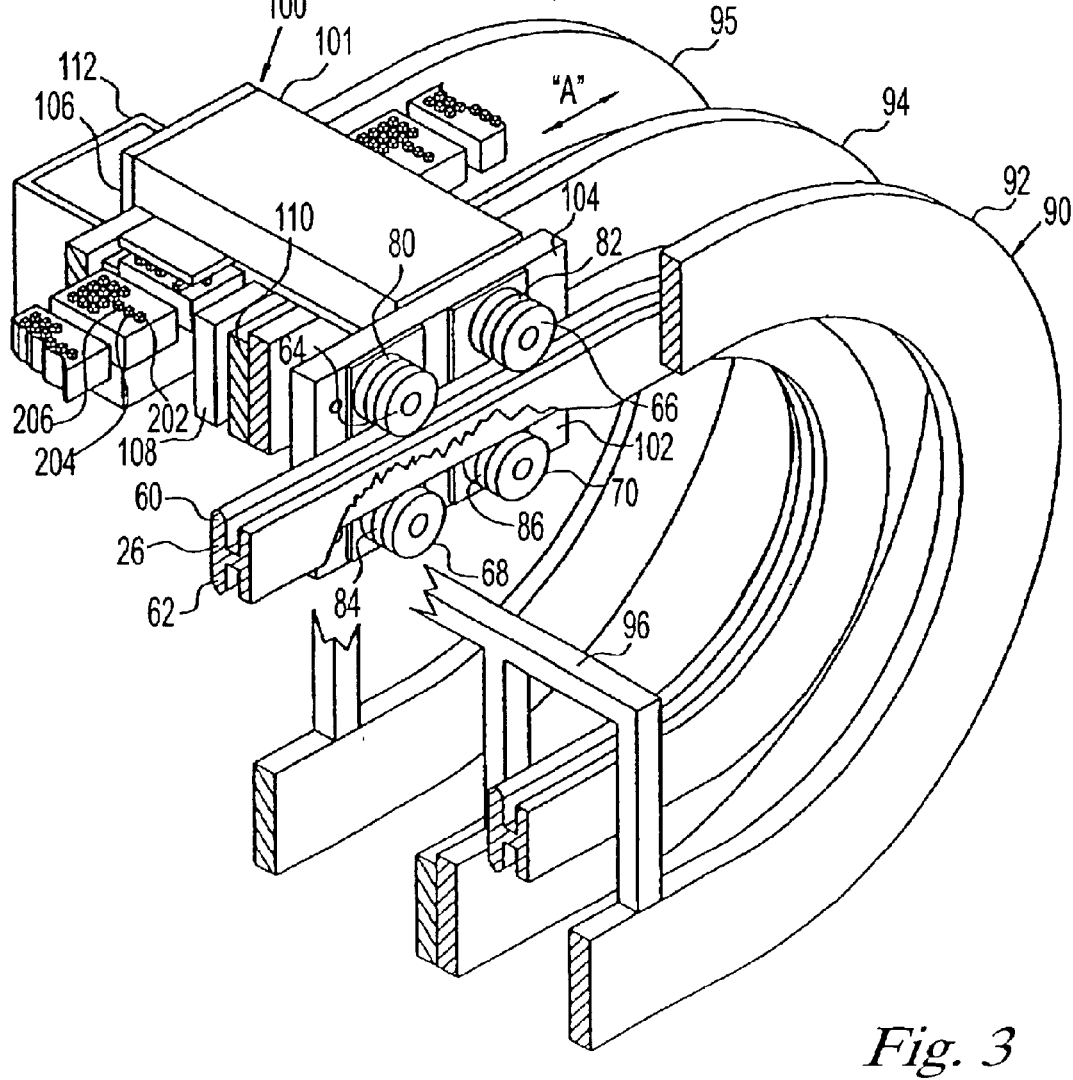
FIG. 3 is a partial representation, in perspective, of one embodiment of a track system embodying various features of the present invention and depicting a movable element mounted for traversing the track carrying a product receiver therewith.

As depicted in FIG. 1, each movable element, element 22 for example, includes a carriage 32 which is mounted for movement along the track (see also FIGS. 2–4). A reactive element 36, which in FIG. 1 is depicted as a permanent magnet, is mounted on the carriage 32. The position of the reactive element is maintained in spaced apart relationship to the aligned coils 39 by a distance which places the reactive element within the sphere of influence (see force lines 40 of FIG. 1), of an electromagnetic field 45 developed by each of the enabled coils. It is to be noted that the force lines 40 of FIG. 1 are, intended to be illustrative only and are not intended to be an exact representation of the force lines. Other types of carriages may also be utilized, as the invention is not limited to any of the disclosed carriage embodiments.

In accordance with one aspect of the present invention, each of the movable elements is controlled through a controller 42. The controller is electrically connected via an electrical lead 41, or other communication means, to a series of amplifiers identified in FIG. 1 as Amp 1, Amp 2 and Amp N, with indicators showing that there may be any number of amplifiers disposed between Amp 2 and Amp N. In any event, there is one amplifier provided for each movable element of the system. Each amplifier is provided with a source of conventional electrical energy 43, for example, a conventional three-phrase electrical source. Within the amplifier the electrical energy is modified as a function of the signals from the controller to provide outputs. The output from each amplifier is fed into a coil switching circuit 50. The outputs from the coil switching circuit are fed to respective ones of the coils for the development of an electromagnetic field 45 associated with such coil, the nature of the electromagnetic field being a function of the modified electrical energy that is supplied to the coil.

In FIG. 1, each coil is depicted as including an electromagnetic field 45 and a respective permanent magnet 36 associated with a sub-set of coils and disposed within the sphere of influence of its associated coils. Each of the magnets is rigidly connected to a respective carriage 32 such that movement of the magnet produces corresponding movement of its carriage. The movable elements 22, 24 depicted in FIG. 1 are movably mounted on the track 26 which is disposed substantially parallel to the aligned coils.

Figure 8:
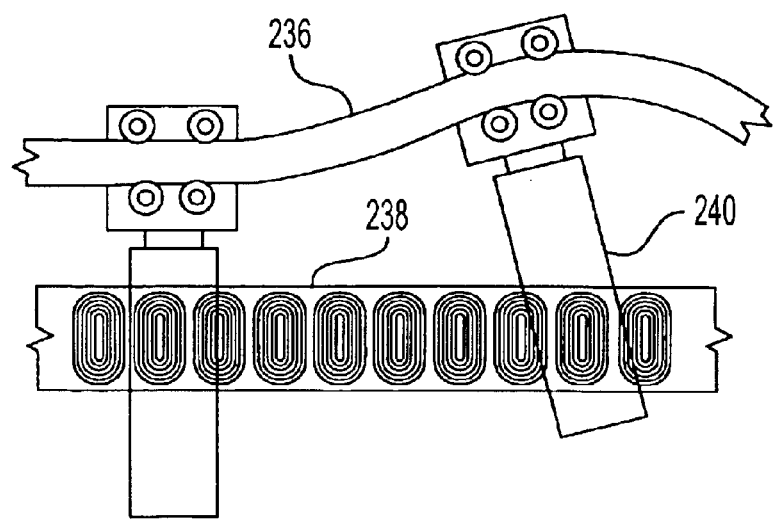
FIG. 8 is a schematic representation of a path along which a plurality of movable members are constrained to move and wherein the path deviates from parallelism with respect to a plurality of aligned electrically conductive coils.

As depicted in FIG. 1, in a preferred embodiment, the aligned coils are divided into segments 52, 54 and 56. Those coils which define a linear segment comprise the segment 52. Other coils which define a first curved segment comprise the segment 54, while further coils defining a second curved segment comprise the segment 56. Thus, if there are multiple curved segments having different radii, each segment of a given radius can comprise a segment, although multiple curved segments can also be constructed as a single segment. The geometry of the length dimensions of the array of aligned coils may be of any convenient form and may include at least one linear segment, at least one curvilinear segment, or a continuously changing curvature, such as a cloverleaf design. As depicted in FIG. 2, the coils may be aligned to define an endless array. FIG. 8 depicts another geometrical combination of aligned coils 238, magnets 240, and associated tracks 236.

In accordance with one aspect of the present invention, the system is provided with a track 26 defining a path 20 along which the plurality of movable elements are intended to move. This track preferably is disposed parallel to the geometry of the array of aligned coils, and preferably is disposed contiguous to the coils. In this manner, each movable element may include a permanent magnet (or electromagnet or inductor) associated therewith and this magnet or inductor will be within the sphere of influence of the electromagnetic fields of the several enabled coils that effect desired motion parameters for the movable elements. Moreover, the track may serve as a fixed rigid support for the plurality of side-by-side electrically conductive coils. These coils are well known in the art and are indicated only generally and collectively in certain of the Figures.

In one specific embodiment, and referring to FIGS. 2–4, the track 26 includes first and second rails 60, 62 which are spaced uniformly apart from one another along the entire length of the track. In FIG. 2, the track is a closed loop. As depicted in FIG. 2, each of a plurality of movable elements, i.e., carriages 100, 103, 105, 107, 109, 111 and 113, is mounted for movement along the track. Each carriage preferably includes first and second sets of wheels disposed at one end thereof and third and fourth sets of wheels disposed at the opposite end of the carriage, although the configuration of the carriage is not critical to the invention. Any type of movable element will suffice provided it remains associated with the path.

Referring to a preferred embodiment, as shown in to FIGS. 3 and 4, the carriage 100 includes a leg 102 having an outer face 104. The first set of wheels 64, 68 are individually mounted at opposite ends of a plate 63 which is centrally pivotally mounted on the face 104 of the leg 102 such that the wheel 64 thereof engages and rides along the rail 60 of the track 26 and the wheel 68 of this first set engages and rides along the rail 62 of the track. The second set of wheels 66, 70 are likewise individually mounted at opposite ends of a plate 63 that is also centrally pivotally mounted on the face 104 of the leg 102 generally alongside the plate 63 and such that the wheel 66 engages and rides along the rail 60 of the track and the wheel 70 engages and rides along the rail 62 of the track. By means of these pivotally mounted sets of wheels, as a carriage enters and passes through a curved segment of the track, each set of wheels pivots about its respective pivot pin 105, for example to accommodate the difference in the radius of curvature, $r_2$, of the rail 60 relative to the radius of curvature, $r_1$ of the rail 62, so that the carriage remains oriented substantially perpendicular to the length dimension of the track.

In the present system, the wheels engage their respective rail in a manner which precludes the derailment of the carriage during its travel along the track. This result is accomplished in one embodiment by defining grooves 80, 82, 84, 86 in the periphery of each of the wheels and providing a double chamfered edge along each side of a planar track. The chamfered edge along one of the sides of the track defines the rail 60 which is received in the grooves 80, 82 of the wheels 64, 66 of the carriage and the chamfered edge along the opposite side of the track defines the rail 62 which is received in the grooves 84, 86 of the wheels 68, 70 of the carriage, thereby "locking" the wheels on the rails.

Thus, in those instances where the track includes a linear segment 52 which transitions into a curvilinear segment 54, the wheels 64, 66 move along and are guided by the outer rail 60 of the track. On the other hand, the two wheels 68, 70 move along and are guided by the inner side edge 62 of the track. For a track of a given width, and which is curved inwardly to form a curvilinear segment of a closed loop track, for example, in the curvilinear segment, the radius of the curvature of the first side edge of the track will be greater than the radius of the curvature of the second side edge of the track. By reason of the pivotal mounting of each set of wheels, the wheels 64, 66 move apart from one another and the wheels 68, 70 move closer together to accommodate the different radii and maintain the carriage substantially perpendicular to the length dimension of the track. Accordingly, there is achieved maximum retention of the desired alignment of the magnet of the carriage and the aligned coils associated with the track, and resulting maximization of the electromagnetic coupling between the magnet of a carriage and the aligned coils and maximization of the controllability which can be exercised over the position of the carriage along the track, especially within that portion of the track wherein the linear segment is transitioning into a curvilinear segment of the track.

It is noted that the first and second sets of wheels mounted at one end of each carriage are duplicated by third and fourth sets of wheels at the opposite end of the carriage (see FIG. 4).

With specific reference to FIGS. 3 and 4, in one embodiment, the track 26 is mounted on a frame 90 which may take the form of two or more oval substantially planar members 92, 94, 95 which are rigidly attached to one another in spaced apart relationship as by means of spacing connectors 96, for example. It will be recognized by one skilled in the art that other configurations of a frame may be employed as the application requires, without sacrifice of the functional nature of the frame. The frame serves, among other things, as a means for mounting of the system on a superstructure of an existing manufacturing machine or to an independent supporting structure, e.g., the floor, etc.

As depicted in FIGS. 3 and 4, each carriage includes a rigid "L"-shaped mounting member 101, one leg 102 of which has mounted on an outer face 104 thereof first and second sets of wheels 64, 66 and 68, 70, respectively, and which are adapted to engage the opposite rails 60, 62 of the track 26 in a manner whereby the carriage is stabilized positionally with respect to the track. Alternatively, this mounting member may be other shapes, such as "U"-shaped, for example. A further leg 106 of the mounting member 101 carries a permanent magnet (reactive element) 108 thereon at a preselected operational distance from the coils 110 that are mounted on the frame member 94 of the frame 90 and associated with the track 26. In this manner, the present inventors provide for establishment and continued maintenance of the operating distance between the coils and the magnet, and for the establishment and continued maintenance of the orientational relationship of the magnet with respect to the coils at all locations along the length of the track. This aspect of the present invention results in enhanced efficiency of operation of the system from the standpoint of responsiveness of the system to ordered changes in the time and position relationship of a given carriage to the track and enhanced speed with which any time and position changes may be effected, among other advantages.

There is appended to the carriage 100 a carrier 112 which is designed to receive and hold a product upon which it is desired to perform multiple functions as the magnet, and hence its carrier, is moved along the path defined by the track. It should be understood that the invention is not limited to utilizing the carriage depicted or any other carriage. The carriage is depicted in order to show an example of how the invention may be utilized to carry items so that work may be performed at a workstation as part of a manufacturing or other process. Another carrier design, such as depicted in U.S. Pat. No. 5,965,963, instead can be used, the invention not being limited to a particular carrier or carriage design.

The direction of movement of the carriage and its carrier along the track is bidirectional as indicated by the arrow "A" of FIG. 3. As desired, the magnet, hence its associated carriage, may be maintained stationary relative to the track for some period of time. For purposes of clarity, only two carriages are depicted in FIG. 1, but as noted, the present invention contemplates a plurality of carriages associated with a single track (as shown in FIG. 2).

As noted hereinabove, in the system depicted in FIG. 1, control over the energizing of the coils, hence control over the movement (or non-movement) of each of the carriages 22 and 24 is effected through a controller 42, a plurality of amplifiers Amp 1 through Amp N, a conventional source of electrical energy 43 fed to each amplifier, a coil switching circuit 50 and appropriate electrical connections. The system depicted in FIG. 1 is termed an "open loop" system. By this term it is meant that there is no electrical or other feedback signal to the controller as determined by an existing motion parameter of any of the carriages at any given time. Rather, as necessary the carriages may be initially "homed" to their respective starting positions and thereafter their movements are effected by means of electrical outputs from the amplifiers which are fed to the coils to effect their energization, such outputs being a function of preprogrammed instructions to be fed to the various coils. In this system, it is presumed that each carriage performs in accordance with the instruction fed to the coils.

More specifically, in the system depicted in FIG. 1, a program for the desired movement of each of the carriages along the path is entered into the controller. At appropriate times, output signals from the controller are fed to respective ones of a plurality of amplifiers. In the present system, there is one amplifier provided for each carriage and all instructions for the movement of a given carriage are fed through its associated amplifier. Generally stated, the output from a given amplifier is fed to a coil switching circuit 50 from which the amplifier output is fed to appropriate ones of the coils that are at that given point in time associated with the carriage which is associated with the amplifier in question. Upon receipt of the signal from the coil switching circuit, the affected coils generate appropriate respective electromagnetic fields. The magnet associated with the carriage in question, being within the sphere of influence of the electromagnetic field(s) of the coil(s) which receive the output from the amplifier through the coil switching circuit, reacts to the electromagnetic field(s) to either maintain the carriage stationary or to effect its movement to a new location along the path.

Figure 5:
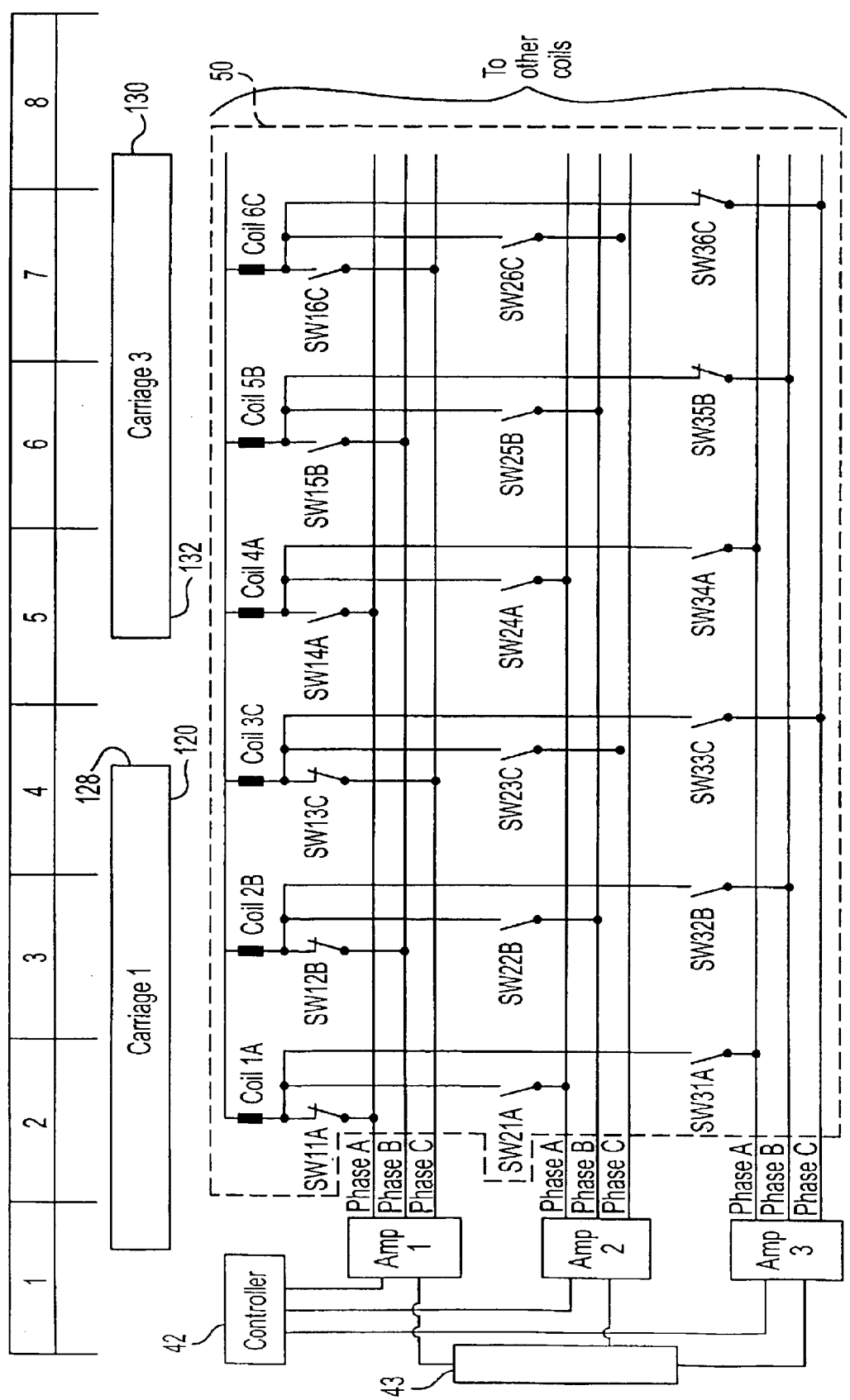
FIG. 5 is a schematic representation of one embodiment of a control system employed in the present invention for independent control of each of a plurality of movable elements along a prescribed path.

In FIG. 5, there is diagrammatically depicted one embodiment of the present control system for use in a three carriage system, but only carriages 1 and 3 are shown in FIG. 5. The depicted system includes a first subset of three coils 1A, 2B, and 3C, a second subset of three coils 4A, 5B and 6C. The depicted length of each carriage is indicative of the required length of the permanent magnet 120, 122 associated with each carriage for obtaining proper switching of the coils. In the depicted embodiment, this length extends over three coils. The depicted system further includes a source of electrical energy 43, which in FIG. 5 is a source of three-phase electrical power, modified by an amplifier, AMP1, AMP2, AMP3 associated with each carriage, and a controller 42. As depicted, in FIG. 5. SW11A refers to a switch for amplifier 1, coil 1 and phase A. In like manner SW13C refers to a switch for amplifier 1, coil 3, and phase C. The "turn on" point for each coil is when the leading edge of the carriage crosses the beginning of a zone, e.g., zones 1–8 as shown in FIG. 5. The "turn off" point for each coil is when the trailing edge of the carriage crosses the beginning of a zone. In FIG. 5, SW37A would be closed if it were shown in the Figure. The output from each amplifier comprises modified phases A, B and C of the electrical energy. With respect to the first amplifier, AMP1, Phase A thereof is electrically connectable, through switch SW11A to coil 1A of the first subset of coils, Phase B thereof is electrically connectable, through switch SW12B to coil 2B of the first subset of coils, and Phase C thereof is electrically connectable through switch SW13C to coil 3C of the first subset of coils. Further, phase A of the first amplifier is electrically connectable through switch SW14A to coil 4A of the second subset of coils, phase B is electrically connectable through switch SW15B to coil 5B of the second subset of coils, and phase C is electrically connectable through switch SW16C to coil 6C of the second subset of coils.

With respect to the second amplifier, AMP2, phase A thereof is electrically connectable through switch SW21A to coil 1A of the first subset of coils, phase B thereof is electrically connectable through switch SW22B to coil 2B of the first subset of coils, and phase C thereof is electrically connectable through switch SW23C to coil 3C of the first subset of coils.

With respect to the third amplifier AMP3, phase A thereof is electrically connectable through switch SW31A to coil 1A of the first subset of coils, phase B thereof is electrically connectable through switch SW32B to coil 2B of the first subset of coils, and phase C thereof is electrically connectable through switch SW33C to coil 3C of the first subset of coils.

By reason of these electrical connections of the three amplifiers to the three coils of the first subset of coils, at any given time, these three coils of the first subset of coils may be powered by either of the three amplifiers.

In operation, as the leading end 128 of carriage 1 passes into zone 2, switch SW11A closes, enabling coil 1A to receive electrical energy from Amp 1 through the closed switch SW11A, and to generate an electromagnetic field 45 to which the permanent magnet associated with carriage 1 reacts. Depending upon the nature of the electrical energy fed from amplifier AMP1, this reaction may involve maintaining of carriage 1 stationary or may urge carriage 1 to move in a forward or backward direction, at a given velocity, to accelerate or decelerate, and/or be moved with a given force, or a combination of these motion parameters. Assuming carriage 1 is urged forwardly, as the leading edge 128 thereof enters zone 3, switch SW12B closes whereupon coil 2B is enabled and develops an electromagnetic field 45 that fictions in cooperation with the magnetic field of coil 1A.

With respect to carriage 3, in FIG. 5, this carriage is depicted as being disposed within zones 5–8. The leading end 130 of the carriage 3 is depicted as having entered zone 8, while its trailing end 132 is depicted as having passed the beginning of zone 5. Under these circumstances, switch SW34A has opened, stopping the flow of electrical energy to coil 4A, while switches SW35B and SW36C, which are closed as the leading end 130 of carriage 3 passes the beginning of each of zones 6 and 7, remain closed so that electrical energy continues to flow to coils 5B and 6C. As noted, if switch SW37A were depicted in FIG. 5, this switch would be closed.

Figure 6:
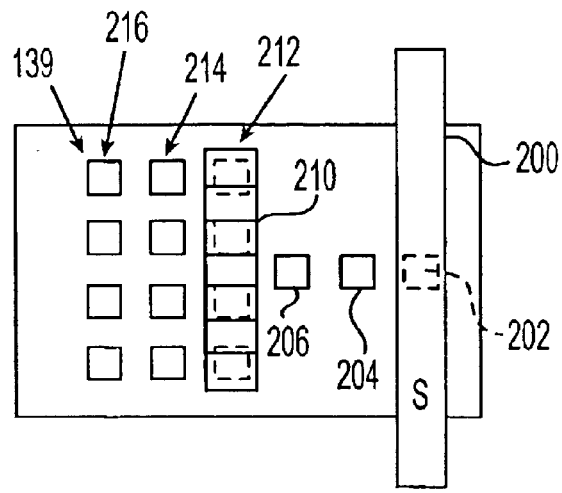
FIG. 6 is a top view representation of one embodiment of an array of sensors employed in one embodiment of a control system of the present invention.

Referring to FIGS. 3, 4 and 6, opening and closing of each of the switches of FIG. 5 may be effected employing Hall Effect sensors which are triggered by a magnet 200 mounted on the carriage 100 and in operative proximity to a respective Hall Effect sensor 202. In the depicted embodiment, the south pole of the magnet faces outwardly of the plane of FIG. 6 and its north pole faces into the plane of FIG. 6. Each Hall Effect sensor may be associated with a power switch (triac, transistor or other) which enables a coil as a carriage moves past its respective Hall Effect sensor as is known in the art. This permits an amplifier to feed electrical energy to that coil which is associated with the given switch. In the depicted embodiment, there are shown three such Hall Effect sensors, one sensor 202 for a first carriage, a second sensor 204 for a second carriage, and a third sensor 206 for a third carriage. Each sensor is specific for its respective carriage by reason of the spatial location of the magnet mounted on the carriage relative to the spatial location of its respective Hall Sensor on the frame 90.

Figure 7:
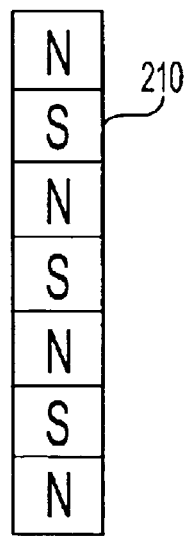
FIG. 7 is a top view of a magnet member comprising a multiplicity of individual aligned magnets as employed in one embodiment of a control system of the present invention.
Figure 6A:
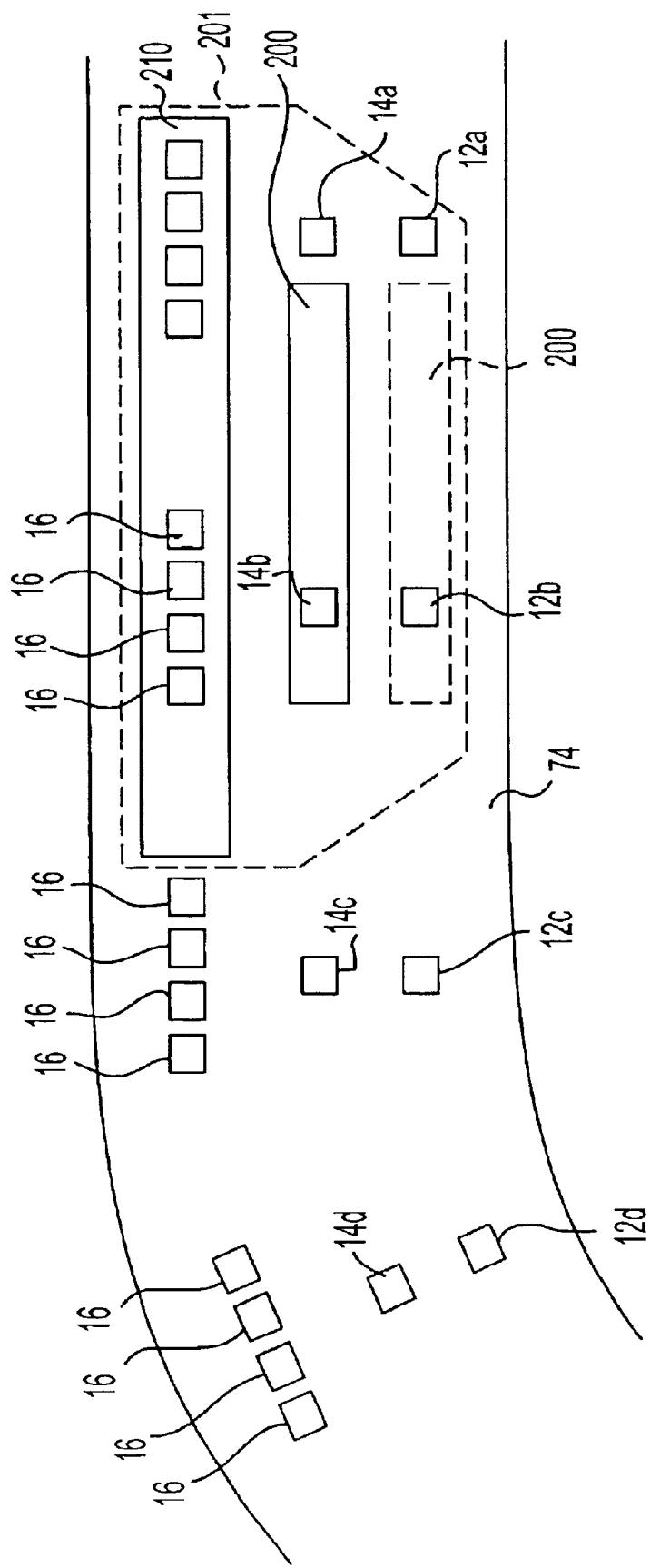
FIG. 6A is a top view representation of another embodiment of an array of sensors employed in one embodiment of the control system of the invention where the control system utilizes multiplexing.

In the embodiment depicted in FIGS. 6, 6A, and 7, the magnet 210 comprises a plurality of aligned magnets whose poles alternate along the length of the magnet. This magnet 210 is oriented on its respective carriage with its length dimension parallel to the length dimension of its respective row of Hall Effect sensors. Thus, as depicted in FIGS. 6 and 6A, movement of the magnet 210 along its path passes the individual Hall Effect sensors of its respective row 212 (sensors 16 in FIG. 6A). A series of sine-cosine signals are generated as the magnet 210 passes the sensors and these signals are fed to a signal decoder that produces outputs identified as Channel A and Channel B that are in turn fed to a driver. Other types of sensor and/or feedback arrangements will be recognized by persons skilled in the art and are equally applicable to the present invention.

Figure 11:
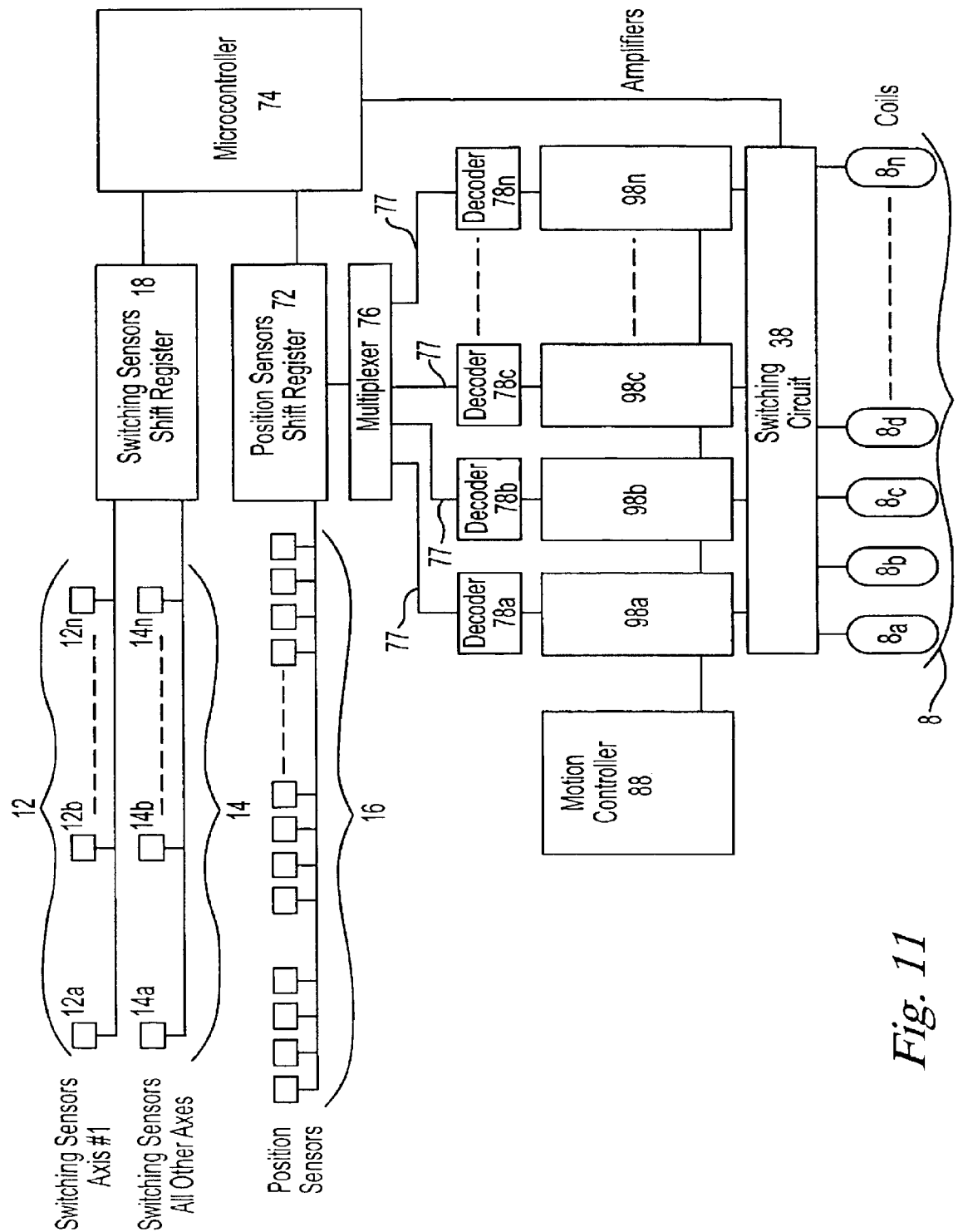
FIG. 11 is a diagram depicting a preferred alternative motion control system of the invention that utilizes multiplexing.

A more preferred control system may be provided through multiplexing, as depicted in FIG. 11. As shown in FIG. 11, in this embodiment of the control system, a plurality of sensors 16 for sensing the position of the carriages on the path are operatively associated with a multiplexer 76. A plurality of leads 77 are associated with the multiplexer 76, one for each carriage. These leads 77 carry the signal provided by the position sensors 16, which can be Hall Effect devices, after the signals are fed through the multiplexer 76. A signal decoder 78 may preferably be associated with each set of leads 77 to decode the signal coming from the multiplexer 76, which is then fed to a plurality of amplifiers 98. The amplifiers 98 are operatively associated with the motion controller 88 or motion control computer, which commands the amplifiers 98 to provide specific signals to the coils 8. Microcontroller 74 signals a plurality of power switches in the switching circuit 38 to open and/or close. These switches are opened and closed to activate the subsets of coils 8 of the linear motor, as discussed in greater detail for FIG. 5. In this system, the opening and closing of each of the switches may be effected using Hall Effect Sensors, which are triggered by a magnet 200 mounted on each carriage 100. The use of multiplexing allows for the use of a smaller number of sensors. A sensor array for use in a multiplexed system is shown in FIG. 6A. Switching sensors 12 are associated with a first axis, and switching sensors 14 are associated with all other axes. These switching sensors 12, 14 are associated with a shift register 18, which is then associated with a microcontroller 74. A microcontroller is associated with switching circuit 38, such that the amplifiers 98 are triggered by the switching sensors 12, 14 in order to provide power to the respective coils 8. Other types of control systems and sensors may also be utilized, the invention not being limited to the above descriptions.

Referring to FIG. 6A, where sensors are shown for a multiplexed control system, printed circuit board 74 is shown with a plurality of sensor arrays positioned along the surface of the board 74 for a curvilinear path. Printed circuit board 74 is preferably positioned under or above plate 201, is oval in shape, and lies congruently with tracks 58, 60. Three rows of sensors are provided on the circuit board 74 for each sensor array. The first two rows include coil switching sensors, which are utilized to switch the coils on and off as switching magnet 200 passes by the sensors. A first row includes sensors 12, which are switching sensors for a first carriage. A second row includes sensors 14, which are switching sensors for all remaining carriages. For the first carriage, switching magnet 200 is positioned on plate 201 such that it travels along the path defined by the first row of sensors 12. For the second through n carriages, switching magnet 200 is positioned on plate 201 such that it travels along the path defined by the second row of sensors 14. An encoder magnet 210 is also provided on each carriage, in addition to a switching magnet 200. Encoder magnet 210 travels over a third row of sensors 16. In this row, four encoder Hall Effect sensors are provided for each array. Sensors 16 are utilized to determine the position of the individual carriages along the tracks 58, 60. Encoder magnet 210 is positioned on each encoder plate 201. As is evident from a comparison of FIGS. 6 and 6A, the use of multiplexing allows for fewer rows of sensors than in a non-multiplexed system. It should be noted that more than one printed circuit board may be utilized.

Switching magnet 200 preferably has a length that extends to cover at least one and, more preferably, two sensors at once, when positioned with the sensors under the ends of the magnet 200. Encoder magnet 210 preferably has a length that extends to cover at least two full lengths of position sensor 16 arrays. As shown in FIG. 6A, when encoder plate 201 passes by the curvilinear portion of the printed circuit board 74, magnets 210 and 200 continue to be in engagement with their respective sensor arrays.

Alternatively, magnetostrictive sensors can be used in addition to or in replacement of Hall Effect-type sensors. Feedback signals from magnetostrictive sensors can be used for homing, commutation alignment, or other parameter sensing. For example, in another embodiment at least one magnetostrictive sensor can be disposed along the path that guides the movable elements or carriages. The controller is operatively associated with each sensor and each movable element. The controller receives at least one signal from one of the sensor(s) which is representative of at least one motion parameter of at least one of the associated movable elements. The motion parameter is at least one of the following motion variables: position, direction, velocity, or acceleration, among others. In this embodiment, the magnetostrictive sensor(s) can provide absolute position data when the movable elements are in motion. Furthermore, the sensor(s) can provide electrical or commutation alignment and/or homing of the carriages, when the movable elements are stationary. In one embodiment of the invention, a plurality of magnetostrictive sensors are positioned on the path in an overlapping configuration, although a single sensor may also be utilized. In a preferred embodiment, a magnet is associated with each movable element for operative association with the magnetostrictive sensors.

In another embodiment, at least one magnetostrictive sensor is disposed along the path and at least one non-absolute feedback sensor is disposed along the path. The controller is operatively associated with each sensor and each movable element. The controller receives at least one signal from one of the sensors which is representative of at least one motion parameter of at least one of the associated movable elements. The non-absolute feedback sensor is selected from a group consisting of Hall Effect sensors, step and direction sensors, incremental sensors, or magnetoresistive sensors. It is recommended that a single sensor be used to provide feedback such that commutation alignment and homing of the carriages can be accomplished, although a plurality of sensors can be used in an overlapping configuration. The movable element also preferably includes a first magnet operatively associated with each magnetostrictive sensor and a second magnet operatively associated with each non-absolute feedback sensor. In addition, the non-absolute feedback sensors can be multiplexed, as discussed in connection with FIGS. 6A and 11.

The controller can be provided with at least one digital signal processor (DSP) electrically connected to a controller. Alternatively, the DSP can be replaced with separate logic devices, such as counters, latches, an oscillator, a selector, and a processor as shown in U.S. application No. 60/137,346, which was filed on Jun. 3, 1999 and entitled "Position Feedback System." The disclosure of this application is incorporated herein by reference in its entirety.

Recommended magnetostrictive sensors are commercially available from MTS Systems Corporation of Cary, North Carolina under the name of Temposonics® III, Model L series (LD). Other magnetostrictive sensors from MTS may also be used, such as those with the majority of the sensor electronics located spaced from a waveguide. A recommended DSP is commercially available from Texas Instruments under the part number TMS320F243.

In a "closed loop" control system, a detection arrangement is provided in proximity to the path and the movable elements that are movable there along, to detect the position of each movable element along the path at all given times and preferably other parameters such as direction of movement, speed, acceleration, force, torque, jerk, etc. of each movable member.

Referring to FIGS. 4, 6 and 7 in one embodiment of a feedback arrangement suitable for use in the present system, an array 139 of Hall Effect sensors is mounted on frame member 95 in functional proximity to a further magnet 210 of the carriage 100 moving along the track. This array includes a plurality of Hall Effect sensors arranged in three rows 212, 214, 216 that are aligned with the length dimension of the track 26, one row per carriage. These Hall Effect sensors of each row are spaced apart from another. The magnet 210 is mounted on each carriage in position such that movement of the carriage moves its magnet 210 past that row of Hall Effect sensors which is representative of the carriage in question.

Figure 9:
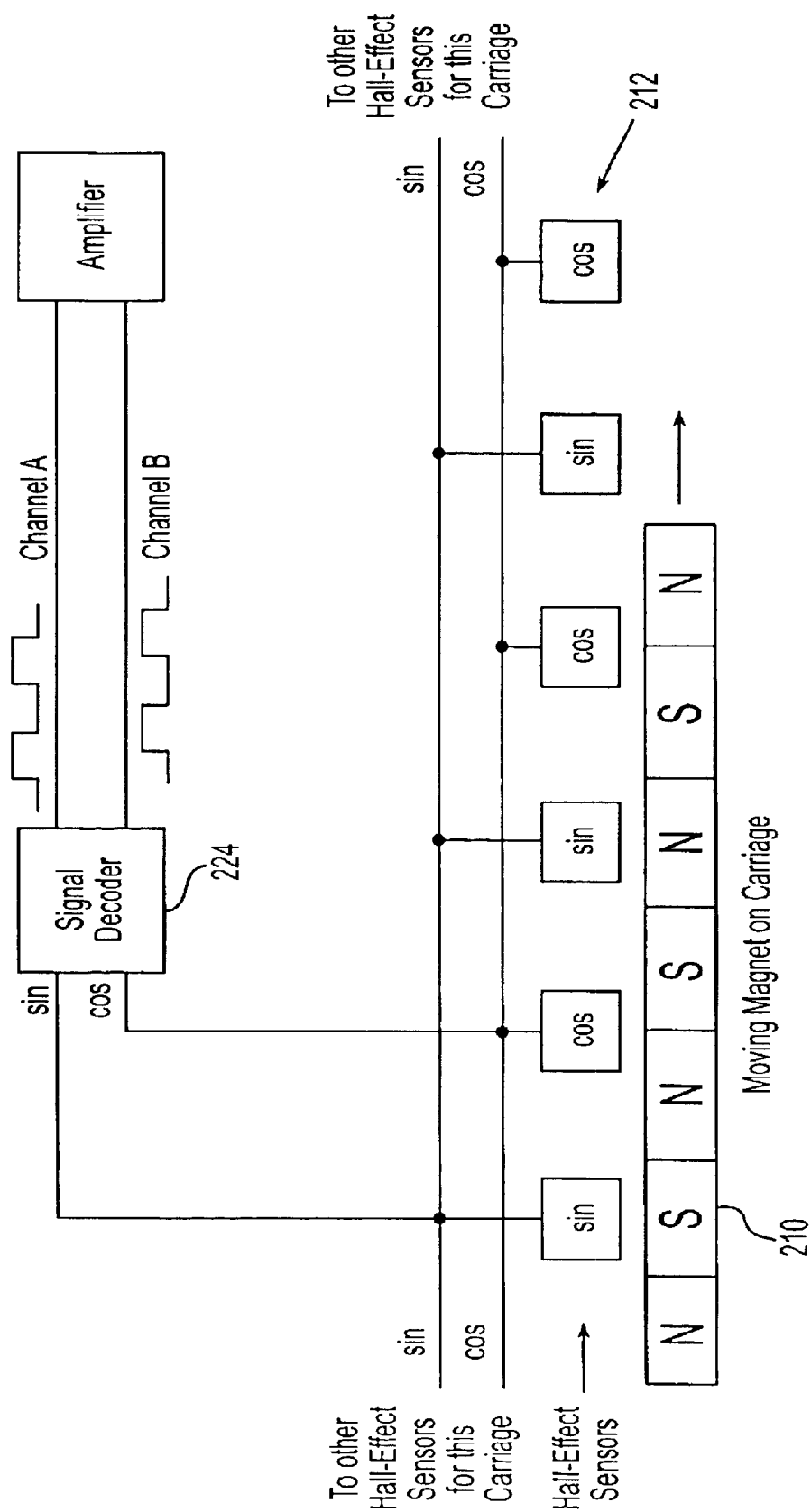
FIG. 9 is a diagram depicting one embodiment of a subsystem suitable for sensing one or more motion parameters of a movable element (carriage) as employed in the present invention.

In the embodiment depicted in FIG. 7, the magnet 210 comprises a plurality of aligned magnets whose poles alternate along the length of the magnet. This magnet 210 is oriented on its respective carriage with its length dimension parallel to the length dimension of its respective row of Hall Effect sensors. Thus, as illustrated in FIG. 9, relative movement of the magnet 210 past the individual Hall Effect sensors of its respective row 212, for example, generates a series of sine-cosine signals which are fed to a signal decoder 224 that produces outputs identified as Channel A and Channel B that are, in turn, fed to a servo amplifier. Other types of sensors and/or feedback arrangements will be recognized by a person skilled in the art and are equally applicable to the present invention, such as those depicted in U.S. Pat. No. 5,965,963, the content of which is expressly incorporated herein by reference thereto.

In one embodiment of the invention, within the controller 42, there may be provided a profile for each carriage. A profile may be a table representing the relationship between the carriage position and time. The path of each carriage is described in this table by a plurality of points, or could alternatively be provided by, for example, an equation or algorithm. A single command to a carriage basically tells the carriage that it needs to move from one position to another position within a specified period of time.

Figure 10:
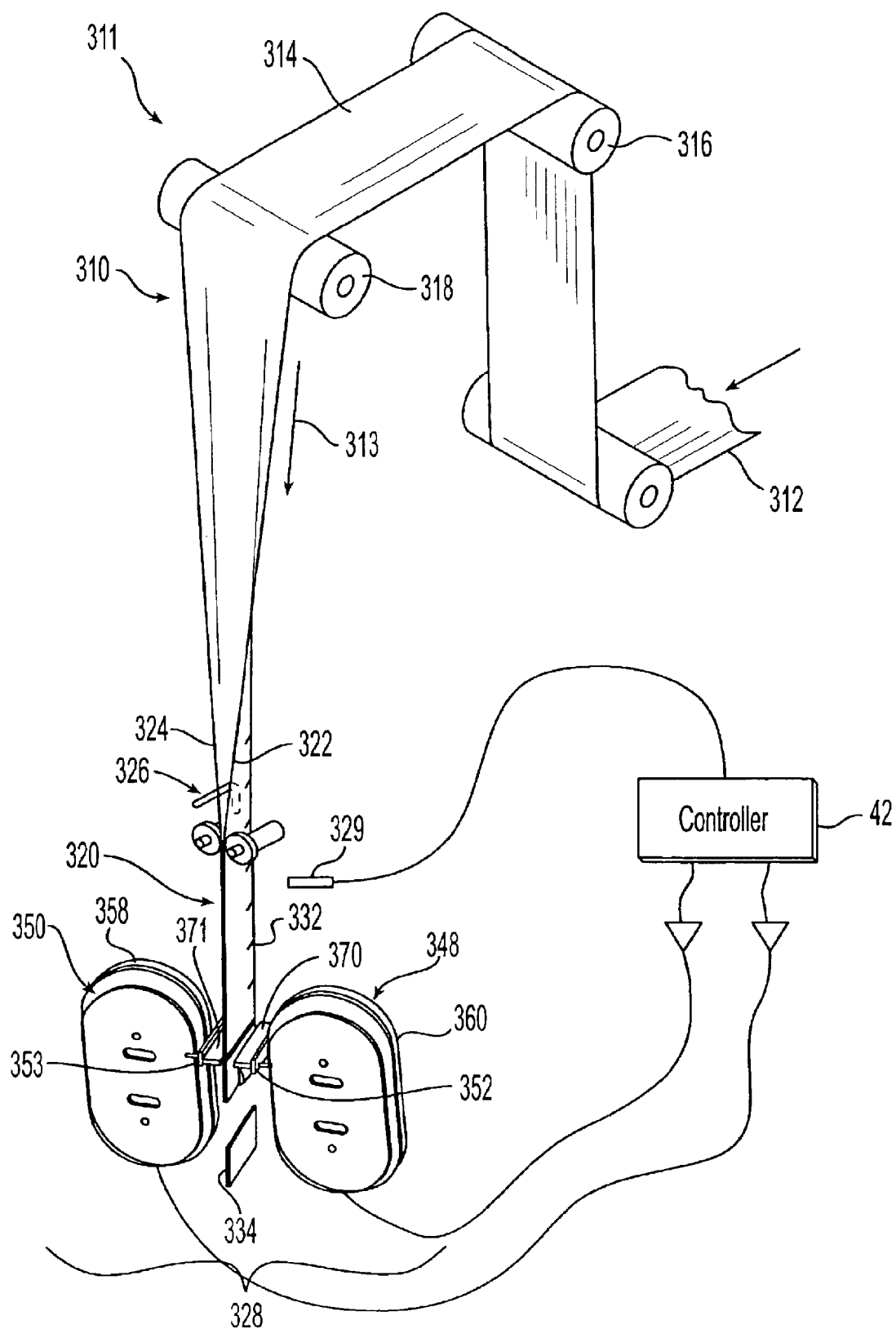
FIG. 10 is a schematic representation of another embodiment of the system embodying various features of the present invention and depicting control over the movement of a plurality of movable elements along a path in a packaging machine.

One embodiment of a manufacturing process employing the various features of the invention, in a form, fill, and seal packaging machine 310, is schematically depicted in FIG. 10, where a web 312 of packaging material, which preferably includes at least one sealable surface 314 thereon, is fed forwardly 313 through a web feeder 311 over guide rolls 316, 318 and formed into a tube 320. The longitudinally overlaid side edges 322, 324 of the web 312 are sealed to close the tube along the longitudinal edge thereof. The side edges may be overlain either with the undersides against each other or overlapped with the undersides facing in the same direction. A strip of tape (not shown) may be provided along one or both of the longitudinal edges 322, 324 to assist in tube formation.

Product, such as a juice, milk, or other liquid or non-liquid material, is fed into the formed tube at a filling station 326. The filled tube is then forwarded to a sealing station 328, where the transverse seals of the package 334 are formed at, preferably, equally spaced apart locations along the length of the tube, although it is contemplated that non-equal lengths may also be formed if so desired. Sealing may occur by heat or other known means. After the tube is sealed, it is severed transversely of its length and within the bounds of the transversely sealed areas to form individual packages filled with the product. Commonly, where equal sized packages are produced, each of the packages is filled with a consistent volume of product. In form, fill, and seal packaging machines, in particular, consistency of volume is provided by making the individual packages of equal volume when sealed. Thus, the individual transverse seals are preferably formed at equally spaced apart locations along the length of the web.

In a preferred embodiment of the form, fill and seal packaging machine depicted in FIG. 10, the sealing station 328 includes first and second sealing jaw subassemblies 348 and 350, respectively, which are disposed on opposite sides of the tube. These subassemblies 348, 350 include at least one carriage 352, 353 and preferably a plurality of carriages. The carriages 352, 353 are preferably mounted on respective tracks 358, 360 along closed loop paths. Alternatively, the carriages may be mounted on open loop paths. Preferably, instead of varying the velocity of the web 312, the positioning of the carriages 352, 353 and their associated scaling jaws 370, 371 is controlled by a controller 42, or other controlling mechanism, to ensure that each pair of sealing jaws 370, 371 registers with the appropriate portion of the tube at a preselected location. This serves to ensure proper package 334 size.

Figure 12:
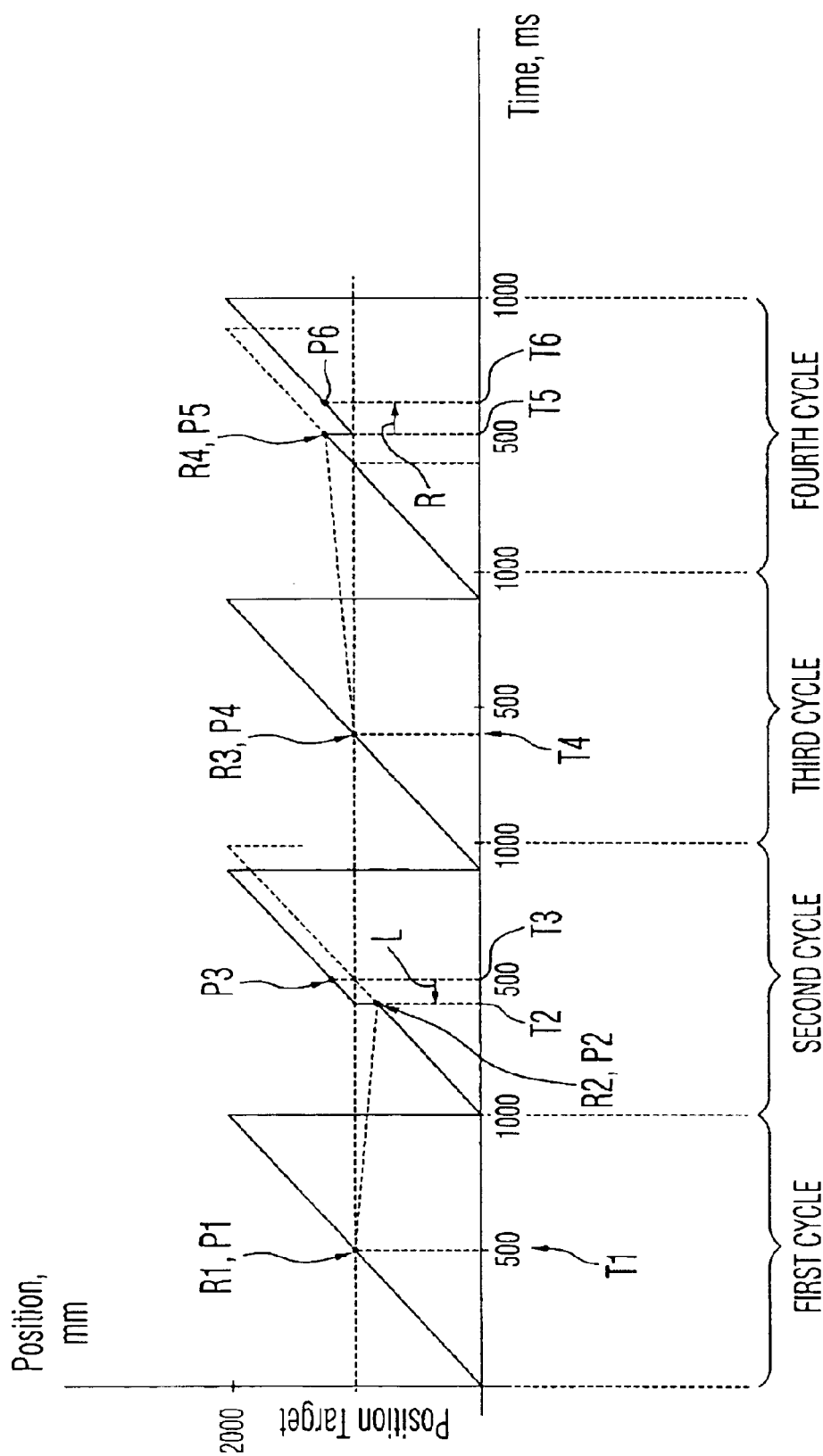
FIG. 12 is a graph of a position profile for one carriage showing a technique for registration correction.
Figure 13:
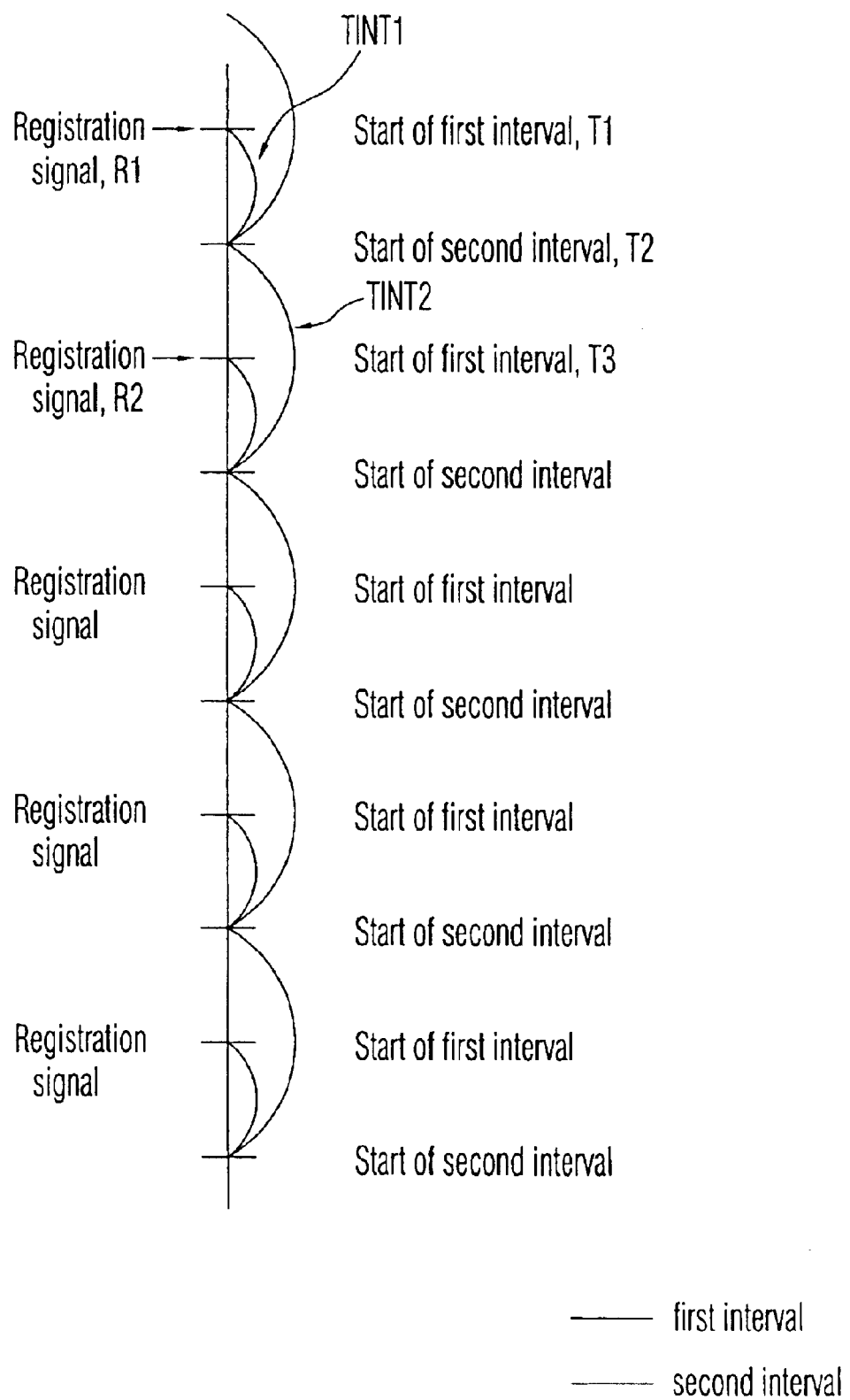
FIG. 13 is a diagrammatic representation of a method for handling registration correction using first and second time intervals.

A preferred technique for registering sealing jaws 370, 371 is shown in connection with FIGS. 10, 12, and 13. A packaging machine according to the invention, or any other type of machine that requires registration, may utilize a registration sensor 329 in connection with a registration mark 332, as shown in FIG. 10. Registration sensor 329 is preferably an optical sensor or photoeye capable of optically detecting registration marks 332, which are provided at spaced intervals on the packaging web. Alternatively, the sensor may be an infrared or fluorescent ink sensor or a proximity probe, or any other type of position sensing device.

In order to perform proper registration of the sealing jaws, the present invention uses the registration marks 332 and sensor 329, and programmable windows or time intervals to monitor carriage movement, as depicted in FIGS. 12 and 13. When a registration mark 332 passes by the registration sensor 329 and the sensor 329 detects the mark, a registration signal R1 is sent to the motion controller. In response, the controller begins a first time interval TINT1 at time T1. The first time interval TINT1 is used to indicate the start of a second interval TINT2. When the first time interval TINT1 ends at time T2, the second time interval TINT2 begins. A second registration signal R2 is received by the controller during the second time interval TINT2, which indicates that the operation of the machine 310 and sealing assemblies 328 is normal.

If no subsequent registration signal is received during the second time interval, then another second time interval begins at the end of the first time interval and the controller knows that the machine is operating abnormally. If multiple registration signals are received in the second time interval, the machine is also operating abnormally. Abnormal system operation causes a fault detection signal to be sent to the controller that results in stopping the process, sounding an alarm, displaying the appropriate message to the operator, or taking other appropriate actions. The generation of first and second time intervals is repeated with each registration mark that is detected.

The first time interval is calculated to be a first predetermined time, which is the cycle time divided by the number of carriages on the track. If six carriages are used, the first time interval is the cycle time divided by twelve. The detection of the registration mark should occur in the middle of the second time interval. The second time interval is calculated to be a second predetermined time, which is twice the first time interval, or the cycle time divided by the number of carriages on a track. If six carriages are used, the second time interval is the cycle time divided by six. By these features, the system can detect a missing registration signal or multiple registration signals in a given time.

The registration signals are also used to check and modify the position of the carriages versus a position profile. Thus, the timing of the registration of sealing jaws of the two subassemblies and their movement into engagement with the moving tube 320 (see FIG. 10) for the formation of the transverse seal is also function of the detection of the presence or absence of registration mark 332 on the moving web 312. By this means, the velocity of the forward movement of the tube 320 through the heat sealing station 328 is not modified intentionally. Rather, the positioning of the registered sealing jaws or carriages is modified to accommodate the velocity of the forwardly moving tube 320. Thus, if the velocity of the moving tube 320 varies due to changes in tension in the tube, or due to imprecise functioning of one or more mechanical elements of the FFS machine, the present system detects such variance in velocity of the tube and adjusts the position of the registered sealing jaws to ensure that the sealing jaws engage the tube at a time that is a function of the detection of a registration mark. As desired, the location of engagement of the sealing jaws with the tube need not be directly at the registration mark on the tube, but may be displaced by a set distance from the registration mark. As a result of the flexibility of the present system to position the sealing jaws as a function of the detection of the registration mark, among other things, the present system may be employed to produce any of a variety of package sizes without mechanical change to the system.

Referring again to FIGS. 12 and 13, in the first cycle, once the registration signal R1 is received, the controller uses the actual position of the carriage corresponding to the package with the registration mark that triggered the registration signal R1. The actual position P1 of the carriage is checked against the profile. Since the actual position P1 is equal to the registration position at T1, the actual position P1 is on position target, and correction of the carriage movement is not required.

In the second cycle, the registration signal R2 occurs at T2. The actual position of the carriage is at P2, which is not at the position target. This is earlier than the target time of T3. Therefore, correction is necessary. Correction occurs by shifting the table to the left as indicated by the arrow L by an amount equal to the difference between the time target T3 and actual time T2 when the registration signal was received. After correction, the target time is redefined so that the new Target Time is equal to T4. For example, the new time target is made equal to the last actual time.

The precalculated carriage position profile corresponds to a velocity profile which represents the relationship between carriage velocity and time. During correction, the actual velocity of the carriage will deviate slightly from the predefined velocity profile in order to bring the carriage into synchronization with the shifted table.

When the third registration signal R3 occurs, assuming that there were no disturbances in the functioning of the carriages in the third cycle, the actual position P4 exactly matches the position target T4.

In the fourth cycle, the registration signal R4 occurs at time T5 where the actual position of the carriage is at position P5, which is not at the position target. Therefore, correction is necessary. Correction occurs by shifting the table to the right as indicated by the arrow R. After correction, the target time is redefined. During correction, the actual velocity of the carriage again deviates slightly from the predefined velocity profile in order to bring the carriage into synchronization with the shifted table. This monitoring and correction occur with each registration signal that is sent to the controller.

Correction can occur in the same cycle within which the registration signal occurred. Correction can occur directly after the signal is detected, or correction can be delayed to a later time in the cycle, such as where the disturbance from the table shifting is minimal. Correction can also be skipped or delayed to another cycle completely. If a predetermined, correction maximum limit would be exceeded, correction can be spaced over several cycles. The correction maximum limit allows the system to run smoothly. Packages produced during correction can be marked for rejection. Although the position profile for one carriage is shown, the correction is applied consecutively to subsequent carriages as necessary.

The system is designed so that preferably the registration signal occurs as close as possible to the position and time targets to minimize the correction. By reason of the high precision of the feedback to the motion controller from the position sensors of each carriage, the system is able to run several cycles with acceptable accuracy. Under normal circumstances, the largest correction to be applied commonly is less than a few millimeters. Preferably the corrections are less than about 1 mm and more preferably the corrections are less than 0.2 mm and most preferably the corrections are less than 0.1 mm. The corrections can involve speeding up, or slowing down the associated carriages.

The profile tables, table shifting, and programmable windows are features of the software used to run the motion controller. One recommended software package with these features is commercially available from Automation Intelligence of Atlanta, Ga., which is a subsidiary of Sanyo Denki, under the name "Advanced Motion Language." Other recommended software that includes these features is commercially available from Indramat, a division of Mannesman of Rexroth, under the name "Visual Motion." Yet another recommended software package is available from Motion Engineering, Inc. using their libraries and programming in "C", or Allen Bradley's under the name "Graphics Motion Language."

As discussed above, proper registration of each pair of sealing jaws with the proper, predetermined portion of the workpiece can be controlled as each pair of opposing sealing jaws 370, 371 closes against the tube 320. The predetermined portion of the workpiece preferably is determined as a position along the tube 320, and includes the opposite sides of the tube. In an alternative embodiment, this portion of the workpiece includes two or more locations of the workpiece which may be spaced from each other, but are preferably located close enough for the tools on the cooperating carriage pairs to be in operational association therewith.

In another embodiment, the timing of the registration of sealing jaws 370, 371 of the two subassemblies and their movement into engagement with the moving tube 320 for the formation of a transverse seal is a function of the detection of the registration marks 332 on the moving web. A signal from a workpiece portion sensor, such as registration mark detector 329, is fed to the controller 42 and is analyzed.

Preferably, instead of varying the velocity of the web, the positioning of the registered sealing jaws is controlled to ensure that the next pair of sealing jaws about to engage the workpiece registers with the appropriate portion at the preselected location. In the preferred embodiment, if the velocity of the moving tube 320 varies, such as due to changes in the tension in the tube or due to imprecise functioning of one or more mechanical elements of the FFS machine, the present system detects such variance in velocity of the tube and the position of the marks 332 and adjusts the position and velocity of the registered sealing jaws 370, 371 to ensure that the sealing jaws engage the tube 320 at a time that is a function of the detection of a registration mark 332. As the preferred embodiment includes coupled pairs of carriages, the controller 42 can control the movement thereof based solely on the positions of the carriages located on the work performing side of the subassemblies, and the carriages on the return side of the subassemblies are brought to the top of the subassemblies. The registration in the preferred embodiment can be conducted prior to the engagement of the sealing jaws with the tube 320.

As desired, the location of engagement of the sealing jaws with the tube need not be directly at a registration mark 332 on the tube 320, but may be displaced by a preselected distance from a registration mark. As a result of the flexibility of the present system to position the sealing jaws as a function of the detection of a registration mark, among other things, the present system may be employed to produce any of a variety of package sizes without mechanical change to the system.

When the sealing jaws are engaged in operational association with the web, the jaws cooperatively grip and draw the workpiece in a workpiece direction between the first and second subassemblies at a workpiece velocity. The first and second pairs of carriages are driven at first and second velocities around the subassemblies, and the velocity of the carriages that are engaged with the web can be varied to control the web velocity. In the preferred method according to the invention, the first and second velocities are varied to maintain the workpiece velocity substantially constant.

As stated above, the first and second velocities are also varied relative to each other by the controller, depending on the detected position of the portion of the workpiece to be operated on with respect to the subassemblies and on the workpiece velocity, to register the tools with the respective portions of the workpiece. This is preferably repeated with successive carriages and the portion of the workpiece to be operated on. The absolute velocity around the circuits of the engaged pair of tools and carriages can be varied, to draw the web at a different speed, or of the carriages with the tools to be engaged, to change the spacing from the adjacent, engaged carriages, or both velocities may be varied. This method overcomes errors and variances in spacing between markings on the web, especially where the web is spliced to another section of web, and also allows marks to be spaced differently from each other and registered with and engaged by the tools on every successive mark or portion of the web to be engaged and operated on.

As is evident, the packaging machine described and depicted in FIG. 10 can be employed to produce any of a variety of package sizes without mechanical modification of the system.

Another embodiment of a manufacturing process employing various features of the present invention is depicted in FIG. 2 for an alternative type of packaging machine, where an open-top carton 226 is introduced into a carrier 112 mounted on and movable by a carriage 100. With reference also to FIGS. 3 and 4, this carriage is mounted on a track 26 which includes opposite rails 60 and 62. The first set of wheels 64, 68 having grooved peripheries are mounted on one side face 104 of the carriage 100 for example and in position for the grooves to engage and roll along the rails 60, 62 of the track. A second set of wheels 66, 70 having grooved peripheries also are mounted on the side face 104 of the carriage and in position for the grooves thereof to engage and roll along the rails 60, 62 of the track. As depicted, there may be provided a plurality of carriages 100, 103, 105, 107, 109, 111 and 113 for example, disposed along the length of the track, each of which is independently movable with respect to each other carriage on the track.

One possible use of the system of the present invention is shown in FIG. 2. In FIG. 2, each carriage has attached thereto a carrier 112 which is sized to receive therein a selected open top carton 226. This carton is moved along the track as the carriage is moved along the track. For example, after a carton 226 has been deposited, at a loading station 113, into the carrier 100 with the open top of the carton opening upwardly, the carriage, hence the carton, may be moved along the track to a bottom forming station 115, then to a filling station 117, where the carton may be filled with a material, such as a liquid or solid, then moved along the track to a top-closure station 119 where the open top of the filled carton is closed and the carton contents sealed within the carton, then further moved along the track to a carton takeoff station 121 wherein the filled and closed carton is withdrawn from its carrier 112. The withdrawn carton may be moved, as by a conveyor 123 or other conveying mechanism, to one or more further processing stations and eventually collected for storage or shipment to a purchaser.

Notably, at each of the several processing stations along the length of the track, it may be desired that the carton be retained at a given station for a time which is greater than the time at which the same (or other like cartons) is retained at another of the processing stations. The present invention includes the ability to move each carriage along the track in an essentially infinite combination of starts, stops, changes in direction of movement, selected velocity, force, jerk, torque, or acceleration, or combinations thereof, and/or states of dwell (non-movement) of the carriage and the carton carried within the carrier that is attached to the carriage. In a particular embodiment of the present system for performing a manufacturing operation or the like, the desired position of a given carriage along the length of the track, at a given time may be programmed into the controller 42.

In one embodiment of an operation of the system of the present invention initially, the starting position of each of the carriages is determined. This function may be performed employing a "home" position for each carriage as is known in the art.

Within the motion controller, there may be provided a profile (table), for each carriage, the table representing the desired relationship between the carriage position and time of each carriage relative to the length of the track. The path of each carriage is described in this table by a plurality of points, or could alternatively be, for example, an equation or an algorithm. A single command to a carriage basically tells the carriage that it needs to move from one position to another position within a specified period of time. In an open loop system, compliance with the command to each carriage is not monitored, but is presumed to have taken place as directed.

In a system employing the concepts of the present invention, a plurality of carriages are employed on a single track and each carriage is controlled as to the position and timing at which it (and its carried "working element") are presented to sequentially arranged work stations, retained at the work station, and moved to a further work station. In one embodiment of the present system, it is desired that each carriage present itself (and its "working element") at individual work stations in a given sequence. Thus, it is immaterial how many carriages are present between adjacent work stations or along the return leg of a closed loop track, for example.

The present invention is contemplated for use in any number of processes that require movement along a path. It is envisioned that any system which presently utilizes a conveyor or similar transport-type system could benefit from the advances of the present invention. For example, the present linear motor could replace the conveyor belt shown in U.S. Pat. No. 5,638,461, which concerns a stereoscopic inspection technique. As another example, the present invention could replace the conveyor shown in U.S. Pat. No. 5,074,238, which concerns a production line paint spraying operation. The disclosures of U.S. Pat. Nos. 5,638,461 and 5,074,238 are incorporated herein by reference in their entirety. Thus, it is clear that the present invention has a wide variety of applications.

Whereas the present invention has been described in specific terms, it is to be recognized that various equivalent embodiments may be employed. For example, the movable members of the present system may be mounted for movement along the track by sliding interconnections between the movable member and the track, or the movable member could be levitated magnetically with respect to the track.

Furthermore, while the present invention was described in terms of its use in a packaging machine, the present invention is anticipated to be useful with a large number of applications. Any type of manufacturing or other process is anticipated to derive some benefit from the invention, particularly where a movable element interacts with a tool along a path. Such operations may include assembly, fabrication, molding, screwing, drilling, cutting, hammering, forming, transporting, quality control, printing, labeling, surface treating, and many other types of operations. While sealing jaws and cutters were described in connection with invention, other tools may also be used, such as, for example, volume controllers, working members, implements, bins, cutters, sealers, applicators, sprayers, vacuums, grippers, and other devices.

It should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. Accordingly, the scope of the present invention is to be defined as set forth in the appended claims.

The following applications are filed on even date herewith and the contents of each application is incorporated by reference thereto: U.S. Application No. 09/558,327 to Jacobs et al., entitled "Packaging Machine"; U.S. Application No. 09/558,332 to Jacobs et al., entitled "Machine with Independently Movable Tools"; U.S. Application No. 09/558,234 to Hoffman et al., entitled "Induction Sealing Jaw"; U.S. Application No. 09/558,229 to Ortiz et al., entitled "Packaging Machine"; U.S. Application No. 09/558,063 to Ortiz et al., entitled "Multi-Jaw Transverse Sealer".

What is claimed is:

1. A system for performing a manufacturing operation relative to at least a first path comprising:
   a plurality of first carriages mounted for independent movement relative to a first path;
   a plurality of first active elements operatively associated with a plurality of first reactive elements, each of said first reactive elements associated with a particular one of said plurality of first carriages, to produce relative movement between the first carriages and the first path, with each of said first active elements being independently activated to cause such relative movement;
   a plurality of rows of switching sensors with each of said rows being operatively associated with a particular one of said first carriages, said rows being arranged along said first path, each particular one of said switching sensors being operatively associated with a particular one of said first active elements so as to enable activation of that particular first active element when the particular one of said first carriages operatively associated with the row of switching sensors that includes the particular switching sensor traverses within operative proximity of the particular switching sensor;
   at least one controller for controlling the amount of activation of said first active elements in order to provide independent control of at least one first motion parameter of each said first carriages; and
   a first tool associated with each first carriage for performing at least part of the manufacturing operation;
   wherein the controller selectively controls the amount of activation of said first active elements to independently direct the first carriages along the path so that the manufacturing operation can at least partially be conducted by the first tool.

2. The system of claim 1, wherein the first carriages are movable and the first path is fixed, and the first path is a curvilinear path.

3. The system of claim 1, further comprising:
   a first row of position sensors arranged along the first path;
   a second row of position sensors arranged at different locations along the first path relative to the first row of position sensors;
   a first position magnet affixed to a primary one of the first carriages at a location that corresponds to the first row of position sensors; and
   a second position magnet affixed to a secondary one of the first carriages at a location that corresponds to the second row of position sensors;
   wherein the first and second rows of position sensors are independently responsive to the first and second position magnets respectively as the primary and secondary carriages traverse the first path, and wherein the controller controls the amount of activation of the first active elements based on signals generated by the first and second rows of position sensors to control the movement of the primary and secondary first carriages independently.

4. The system of claim 1, wherein the motion parameter is one or more of force, acceleration, velocity, direction, position, torque, or jerk.

5. The system of claim 1, wherein the first active elements are electrically conductive coils that are electrically insulated from neighboring coils and arranged along the first path, with each of said coils, when activated, establishing an electromagnetic field that is effective to influence said first reactive element when said first reactive element is associated with said electromagnetic field.

6. The system of claim 5, wherein the controller controls the amount of activation of respective ones of said coils as a function of the location of each first carriage along the first path so that each first carriage is independently controlled.

7. The system of claim 1, further comprising:
   at least one second path having a plurality of second carriages mounted for independent movement relative to the second path, said second carriages having associated therewith at least one second motion parameter;
   a plurality of second active elements operatively associated with at least one second reactive element to produce relative movement between the second carriages and the second path, with each of said active elements being independently activated to control such relative movement;
   said at least one controller also for controlling the amount of activation of second active elements in order to provide independent control of the at least one second motion parameter,
   wherein the first tool associated with each first carriage cooperates with the second carriage to perform the manufacturing operation.

8. The system of claim 7, wherein the first and second carriages are controlled to cooperate in the manufacturing operation.

9. The system of claim 7, wherein at least one second reactive element is associated with each second carriage.

10. The system of claim 7, further comprising a second tool associated with said second carriage for cooperating with the first tool to perform at least part of the manufacturing operation.

11. The system of claim 7, further comprising a second controller, with the first controller controlling the movement of said first carriage, and said second controller controlling the movement of said second carriage.

12. The system of claim 11, wherein the first and second active elements are electrically conductive coils that are electrically insulated from neighboring coils and arranged along the first and second paths, with each of said coils, when activated, establishing an electromagnetic field that is effective to influence the first and second reactive elements when the reactive elements are associated with the electromagnetic fields.

13. The system of claim 12, wherein the first controller controls the amount of activation of respective ones of said coils on the first path as a function of the location of each first carriage along the first path so that each first carriage is independently controlled, and the second controller controls the amount of activation of respective ones of said coils on the second path as a function of the location of each second carriage along the second path so that each second carriage is independently controlled.

14. The system of claim 13, wherein the first and second controller are a single controller.

15. The system of claim 7, further comprising at least one third path.

16. The system of claim 1, wherein more than one first carriage is provided and the first carriages are controlled independently from one another along the first path.

17. The system of claim 1, further comprising:
   a plurality of second carriages mounted for independent movement relative to a second path; and
   a plurality of second active elements operatively associated with at least one second reactive element to produce relative movement between the second carriages and the second path, with each second active element being independently activated to control such relative movement, wherein the controller controls the amount of activation of said second active elements in order to provide independent control of the motion parameters of each of said first and second carriages, and the first and second carriages are controlled to meet as they travel along at least a portion of the path so that the manufacturing operation can be conducted.

18. The system of claim 17, further comprising a first tool associated with each first carriage for performing at least part of the manufacturing operation.

19. The system of claim 18, further comprising a second tool associated with each second carriage, wherein the first and second tools cooperate to perform the manufacturing operation.

20. A method for performing a manufacturing operation relative to at least a first path, comprising:

mounting a plurality of first carriages for independent movement relative to a first path;

providing each first carriage with a first reactive element;

operatively associating a plurality of first active elements with the first reactive elements to produce relative movement between the first carriages and the first path, with each first active element being independently activated to control such relative movement;

arranging a plurality of rows of switching sensors along said first path;

operatively associating each row with a particular one of said first carriages;

operatively associating each of said switching sensors with a particular one of said first active elements so as to enable activation of that particular first active element when the particular one of said first carriages operatively associated with the row of switching sensors that includes a particular switching sensor traverses into operative proximity of said switching sensor;

associating a first tool with each first carriage for performing at least part of the manufacturing operation; and controlling the amount of activation of the first active elements to direct the first carriages along the first path where the manufacturing operation is at least partially conducted by the first tool.

21. The method of claim 20, wherein the first carriages are movable and the first path is fixed, the first path is a curvilinear path and the first active elements are selectively activated to independently direct the first carriages along the first path.

22. The method of claim 20, wherein each first carriage has at least one motion parameter and the motion parameter is one or more of force, direction, velocity, acceleration, position, torque, or jerk.

23. The method of claim 20, further comprising:

mounting a plurality of second carriages for independent movement relative to a second path;

operatively associating a plurality of second active elements with at least one second reactive element to produce relative movement between the second carriages and the second path, with each second active element being independently activated to cause such relative movement; and controlling the amount of activation of said first and second active elements in order to provide independent control of each first and second carriage so that the first and second carriages cooperate as they move along at least part of their respective paths in order for the manufacturing operation to be conducted.

24. The method of claim 23, which further comprises associating a first tool with each first carriage and associating a second tool with each second carriage and controlling the first and second tools to cooperate to conduct the manufacturing operation.

25. The method of claim 24, which further comprises moving the first and second carriages in unison along the first and second paths as the first and second tools cooperate to conduct the manufacturing operation.

26. A system for performing a manufacturing operation relative to first path and a second path comprising:

a plurality of first active elements arranged along a first path;

a plurality of second active elements arranged along a second path;

at least one first carriage mounted for movement relative to the first path, each first carriage having a first tool and a first reactive element responsive to activation of the first active elements to produce relative movement between the first carriage and the first path; and at least one second carriage mounted for movement relative to the second path, each second carriage having a second tool and a second reactive element responsive to activation of the second active elements to produce relative movement between the second carriage and the second path; and at least one controller providing independent control of the amount of activation of each one of the first and second active elements in order to provide independent movement of each of the first and second carriages relative to the first and second paths, wherein the first and second tools cooperate to perform at least part of the manufacturing operation.

27. A system for performing a manufacturing operation comprising:

a plurality of carriages including at least one primary carriage, and at least one secondary carriage, said primary and secondary carriages being mounted for independent movement relative to each other and relative to a path, each of said primary and secondary carriages having an associated reactive element;

a plurality of active elements disposed along said path, said active elements being operative to establish fields when activated, said fields influencing said reactive elements and causing relative motion between the carriages and the path;

a primary row of switching sensors arranged along said path;

a secondary row of switching sensors arranged at different locations along said path relative to said primary row of switching sensors;

at least one row of position sensors arranged along said path;

a primary switching magnet affixed to each said primary carriage at a location corresponding to said primary row of switching sensors, each said switching sensor in said primary row being responsive to said primary switching magnet and operative to generate a primary switching signal for enabling activation of an associated one of said active elements when a primary carriage is in proximity to said switching sensor;

a secondary switching magnet affixed to each said secondary carriage at a location corresponding to said secondary row of switching sensors, each said switching sensor in said secondary row being responsive to said secondary switching magnet and operative to generate a secondary switching signal for enabling activation of an associated one of said active elements when a secondary carriage is in proximity to said switching sensor;

a position magnet affixed to each of said carriages at locations that correspond to said at least one row of position sensors, each said position sensor being responsive to at least one position magnet, and being operative to generate a position signal indicative of the position of one of the carriages along said path; and a controller responsive at least to said position signals, and being operative to provide a controlled amount of electrical energy to each enabled active element to effect a desired motion parameter for each of said primary and secondary carriages based on said position signals, said controller being operative to control the movement of said primary carriages independently relative to the movement of said secondary carriages.

28. The system of claim 27, wherein:

said at least one row of position sensors disposed along said path includes, a primary row of position sensors arranged along said first path, and a secondary row position sensors arranged at different locations along said path relative to said primary row of position sensors; and said position magnets include, a primary position magnet affixed to each one of said primary carriages at a location that corresponds to the primary row of position sensors, wherein each of said position sensors in said primary row is responsive to said primary position magnet as said associated primary carriage traverses said path, and operative to generate a primary position signal indicating the position of said primary carriage, and a secondary position magnet affixed to each one of said secondary carriages at a location that corresponds to the secondary row of position sensors, wherein each of said position sensors in said secondary row is responsive to said secondary position magnet as said associated secondary carriage traverses said path, and operative to generate a secondary position signal indicating the position of said secondary carriage.

29. The system of claim 27, wherein said position sensors are operatively associated with a multiplexer.

* * * * *